United States Patent
Cyr et al.

(10) Patent No.: US 11,644,381 B2
(45) Date of Patent: May 9, 2023

(54) POLARIZATION DEPENDENT LOSS MEASUREMENT

(71) Applicant: EXFO Optics, SAS, Lannion (FR)

(72) Inventors: Normand Cyr, Quebec (CA); Bernard Ruchet, Quebec (CA)

(73) Assignee: EXFO Optics, SAS, Lannion (FR)

( * ) Notice: Subject to any disclaimer, the term of this patent is extended or adjusted under 35 U.S.C. 154(b) by 75 days.

(21) Appl. No.: 17/314,228

(22) Filed: May 7, 2021

(65) Prior Publication Data

US 2021/0356359 A1   Nov. 18, 2021

Related U.S. Application Data

(60) Provisional application No. 63/024,741, filed on May 14, 2020.

(51) Int. Cl.
*G01M 11/00* (2006.01)

(52) U.S. Cl.
CPC ........ *G01M 11/337* (2013.01); *G01M 11/331* (2013.01)

(58) Field of Classification Search
CPC ............. G01M 11/331; G01M 11/335; G01M 11/337; G01J 4/04
See application file for complete search history.

(56) References Cited

U.S. PATENT DOCUMENTS

| 5,227,623 A | 7/1993 | Heffner |
| 5,298,972 A | 3/1994 | Heffner |

(Continued)

FOREIGN PATENT DOCUMENTS

CN   102539119 A   7/2012

OTHER PUBLICATIONS

Agilent Technologies, "Polarization Dependent Loss Measurement of Passive Optical Components," Application Note, Mar. 14, 2002, pp. 1-12.

(Continued)

*Primary Examiner* — Hwa Andrew Lee
(74) *Attorney, Agent, or Firm* — Baratta Law PLLC; Lawrence A. Baratta, Jr.

(57) ABSTRACT

There is provided a method for measuring the PDL of a DUT as a function of the optical frequency $\nu$ within a spectral range, which uses a single wavelength scan over which the input-SOP varies in a continuous manner. The power transmission through the DUT, curve $T(\nu)$, is measured during the scan and the PDL is derived from the sideband components of the power transmission curve $T(\nu)$ that results from the continuously varying input-SOP. More specifically, the Discrete Fourier Transform (DFT) of the power transmission curve $T(\nu)$ is calculated, wherein the DFT shows at least two sidebands. At least two sidebands are extracted and their inverse DFT calculated individually to obtain complex transmissions $\mathcal{T}_\ell(\nu)$, $\ell = -J \ldots J$, where J is the number of sidebands on one side. The response vector $|m(\nu)\rangle$ of the DUT is derived from the complex transmissions $\mathcal{T}_\ell(\nu)$ and a matrix $\mathcal{A}$ determined by the continuous trajectory of the SOP of the input test lightwave; and the PDL of the DUT as a function of $\nu$ (PDL curve) is derived therefrom.

19 Claims, 16 Drawing Sheets

(56) References Cited

U.S. PATENT DOCUMENTS

| | | | |
|---|---|---|---|
| 5,371,597 | A | 12/1994 | Favin et al. |
| 6,650,406 | B1 | 11/2003 | Allard et al. |
| 6,856,386 | B2 | 2/2005 | Anderson et al. |
| 6,888,624 | B2 | 5/2005 | Caplette et al. |
| 6,888,625 | B2 | 5/2005 | Anderson |
| 2004/0070759 | A1 | 4/2004 | Andeson |
| 2004/0184029 | A1* | 9/2004 | Anderson ............ G01M 11/337 356/73.1 |
| 2009/0141274 | A1 | 6/2009 | Szafraniee et al. |

OTHER PUBLICATIONS

Keysight Technologies, "PDL Measurements using Polarization Controller," Application Note, Dec. 1, 2017, pp. 1-16.

Telecommunications Industry Association, "Measurement of Polarization Dependence of Insertion Loss of Single-Mode Fiberoptic Components," by a Mueller Matrix Method, Tia Document, FOTP-198, TIA-455-198, Dec. 2002, pp. 1-24.

* cited by examiner

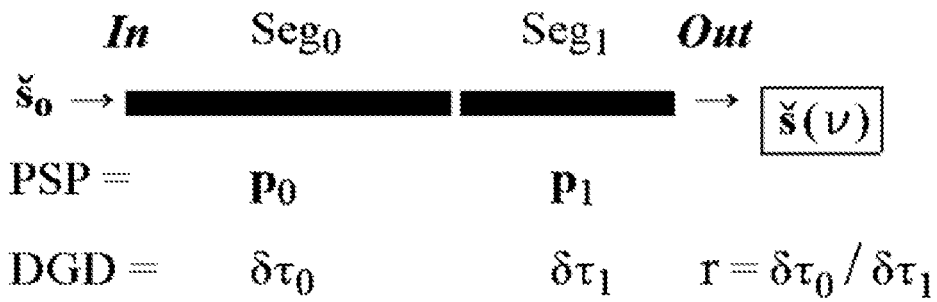

| | *In* | Seg₀ | Seg₁ | *Out* |
|---|---|---|---|---|

$\check{s}_0 \to$ ▬▬▬▬ $\to \boxed{\check{s}(\nu)}$

PSP = $\quad p_0 \quad\quad p_1$

DGD = $\quad \delta\tau_0 \quad\quad \delta\tau_1 \quad r = \delta\tau_0/\delta\tau_1$ <u>Coupling angles</u>: $(\varphi_{\check{s}_0} \quad \varphi_p)$ $\varphi_{\check{s}_0} = \mathrm{acos}(\check{s}_0 \cdot p_0) \quad \varphi_p = \mathrm{acos}(p_0 \cdot p_1)$ <u>Phase($\nu$) (rotation angle)</u> ← biréfringence:

Seg₀ : $\quad \varphi_0 = 2\cdot\pi\cdot(\nu - \nu_o)\cdot\delta\tau_0 + \phi_0$ Seg₁ : $\quad \varphi_1 = 2\cdot\pi\cdot(\nu - \nu_o)\cdot\delta\tau_1 + \phi_1$

Fig. 2

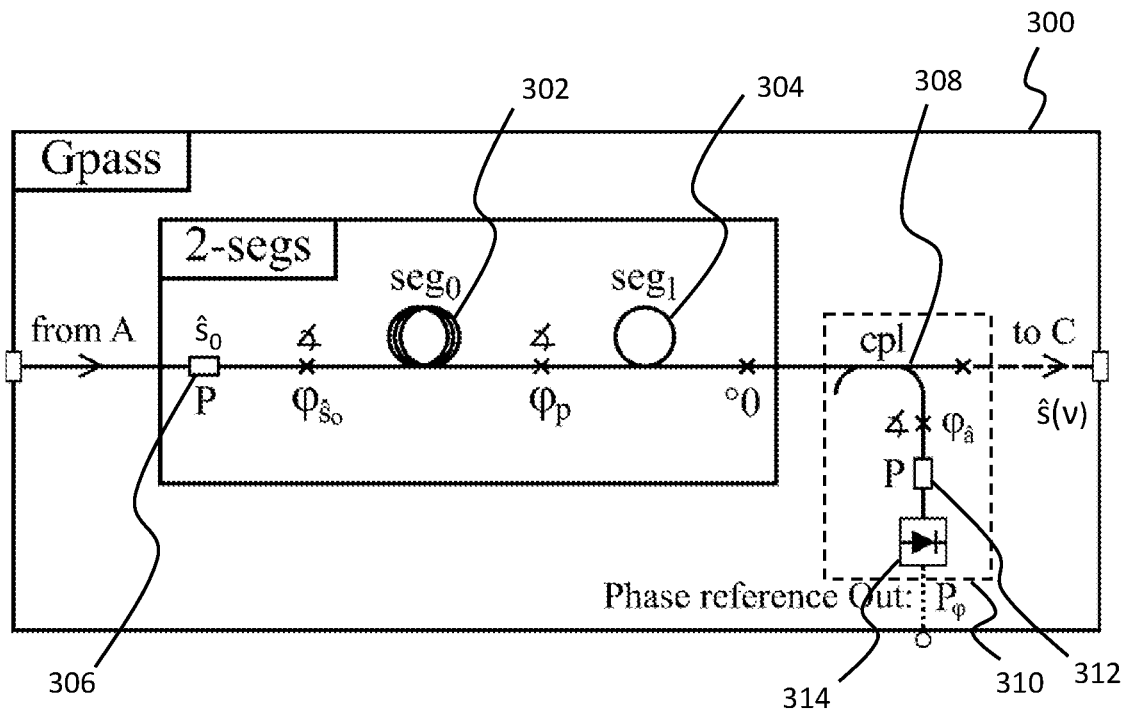

Light Path: ———: PMF   -----: SMF   Electrical path: ·········o
Gpass: Passive SOP-Generator (2-segs + phase reference)
2-segs: 2-segments PMD emulator (here, two pieces of PMF)
cpl: PMF-coupler (suggested coupling ratio: 10%)
P: PMF-polarizer (meaning: a polarizer with PMF pigtails)
$seg_q$: First\second (q=0, 1) piece of PMF. $L_0/L_1 = r$
$\varphi_{\hat{s}_0}, \varphi_p$: Coupling angles that characterize the 2-segs
$\varphi_{\hat{a}}$: Analyzer ($\hat{a}$) - $seg_1$ PSP ($p_1$) angle (phase ref.)
× ⊰: Fusion\angled fusion
⊦⧫: Photodetector + Transimpedance Amplifier

Fig. 3

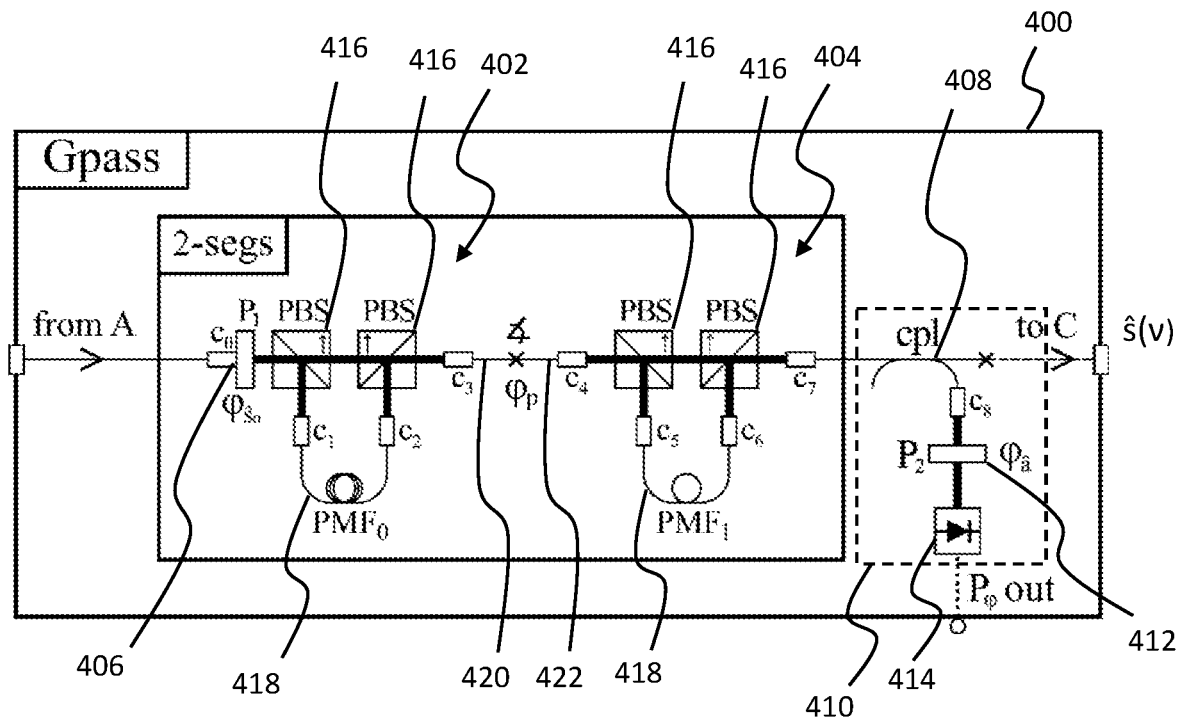

Light Path: ──── : air\glass, ─── : PMF, ---- : SMF
Electrical path: ·······o
Gpass: Passive SOP-Generator (2-segs + phase reference)
2-segs: 2-segments PMD emulator (here with PBSs)
PBS: Polarizing Beam Splitter
$c_0 ... c_8$: Collimator lense (here at one\both ends of a PMF)
cpl: PMF-coupler (suggested coupling ratio: 10%)
$P_1, P_2$: Polarizer (any sort: cube, dichroïc sheet, etc.)
$PMF_q$: Fiber length giving a large delay, $\tau_0/\tau_1 = r$
$\varphi_{s_0}, \varphi_p$: Coupling angles that characterize the 2-segs
$\varphi_a$: Analyzer ($\hat{a}$) - $seg_1$ PSP ($p_1$) angle (phase ref.)
× 4: Fusion \ angled fusion
▶▏: Photodetector + Transimpedance Amplifier

Fig. 4

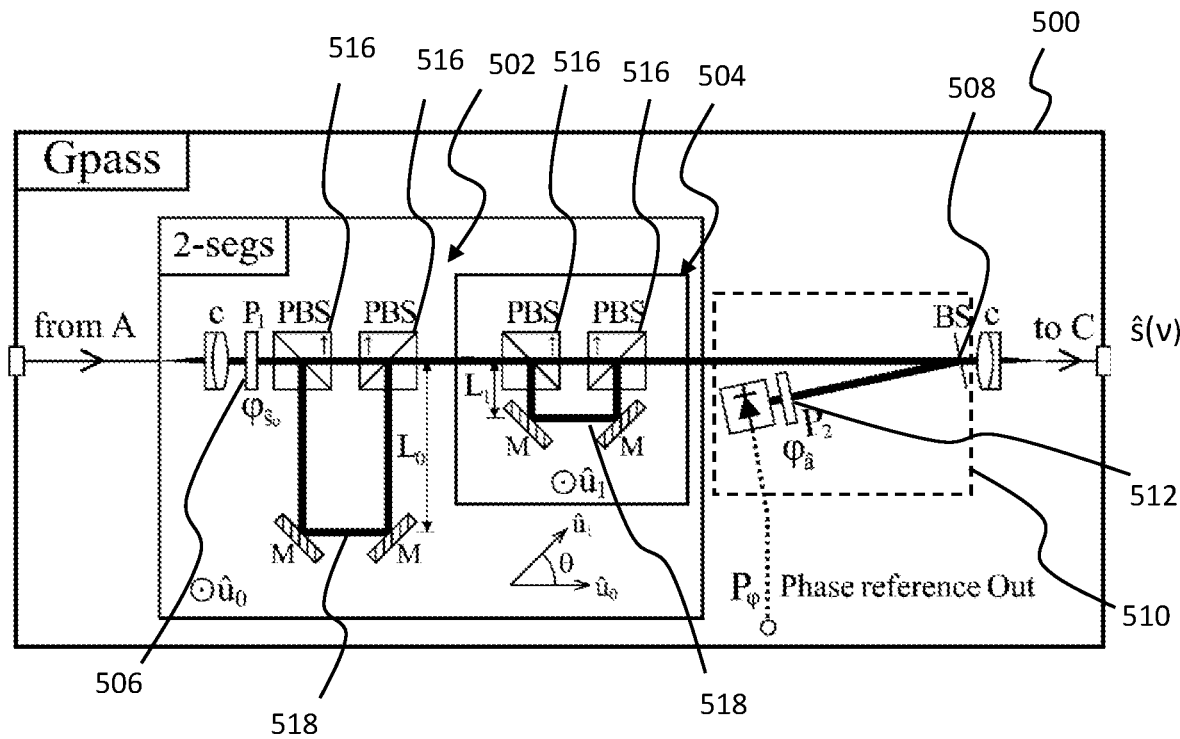

Light Path: ──── : air\glass  ──── : SMF   Electrical path: ········o
Gpass: Passive SOP-Generator (2-segs + phase reference)
M: Mirror
c: Collimator lense ($\infty$-conjugate achromatic doublet, microscope objective)
BS: Beam Splitter
$P_1, P_2$: Polarizer (any sort: cube, dichroïc sheet, etc.)
$\hat{u}_0, \hat{u}_1$: Normal of the mounting plane\plate (angle $\theta = \varphi_p/2$)
$L_q$: Length of the "delay line": $\tau_q = 2L_q/c$, $\tau_0/\tau_1 = r$
$\varphi_s, \varphi_p$: Coupling angles that characterize the 2-segs
$\varphi_a$: Analyzer ($\hat{a}$) - seg$_1$ PSP ($p_1$) angle (phase ref.)
[▲]: Photodetector + Transimpedance Amplifier

Fig. 5

AAF: Anti-aliasing Filter (lowpass)
ADC: Analog to Digital Converter
clk: Clock / time base: $f_e$ is the sampling frequency → Sampling step $dt = 1/f_e$

- *Procedure_3*: Phase reference $\tau_\ell$ : known approximate position of sideband-carrier $\ell$ in the delay domain (see Fig.1E)
  Can also be measured live from $P_\varphi$ at each scan (linear fit of phase $\varphi_\ell$ obtained as below)

Input: N values $P_{\varphi_n}$ of the phase reference output, $n = 0..(N-1)$ $$\varphi_{ref}(\_) = \begin{vmatrix} P \leftarrow \overrightarrow{(w \cdot P_\varphi)} & \leftarrow \text{Apply Hamming window (w) to } P_\varphi \\ F \leftarrow \mathcal{F}\left[\overrightarrow{(P \cdot \vec{e}(-\omega \cdot \tau_3))}\right] & \leftarrow \text{Shift sideband } \ell = 3 \text{ to baseband and compute DFT} \\ z \leftarrow \mathcal{F}^{-1}\left[\overrightarrow{(\sqcap \cdot F)}\right] & \leftarrow \text{Apply sideband-selection filter } \sqcap, \text{ compute DFT}^{-1} \\ \varphi_3 \leftarrow \omega \cdot \tau_3 + \varphi f(z) & \leftarrow \text{Compute phase of the complex number } z \\ & \quad \text{ and resulting phase } \varphi_3 \text{ of carrier } \ell = 3 \\ F \leftarrow \mathcal{F}\left[\overrightarrow{(P \cdot \vec{e}(-\omega \cdot \tau_4))}\right] & \\ z \leftarrow \mathcal{F}^{-1}\left[\overrightarrow{(\sqcap \cdot F)}\right] & \text{Repeat the same as above for sideband } \ell = 4 \\ \varphi_4 \leftarrow \omega \cdot \tau_4 + \varphi f(z) & \\ \left[(\varphi_4 - \varphi_3) \quad (2 \cdot \varphi_3 - \varphi_4) \quad \varphi_3 \quad \varphi_4\right] & \leftarrow \text{Note: the 4 phases are not independent;} \\ & \quad \text{here } \varphi_1 \text{ and } \varphi_2 \text{ are deduced from } \varphi_3 \text{ and } \varphi_4 \end{vmatrix}$$

Ouput: the phases $\varphi_{\ell_n}$ of the 4 sideband-carriers at each sampled point $n$, $1 \leq \ell \leq 4$

Function $\varphi f(z)$ used in Procedure_3:

$\varphi f(z)$ returns the phase (argument) of the complex numbers $z_n$ so that the returned phase can increase or decrease limitlessly with increasing n, $n = 0..(N-1)$, i.e. not limited to the interval $[0..2\pi]$ or $[-\pi..\pi]$.

$$\varphi f(z) = \begin{vmatrix} \varphi_0 \leftarrow \arg(z_0) \\ \varphi_0 \leftarrow \arg(z_{N/2}) \\ \text{for } n \in 1..\text{last}(z) \\ \quad \varphi_n \leftarrow \varphi_{n-1} + \arg(\overline{z_n \cdot z_{n-1}}) \\ \varphi - (\varphi_{N/2} - \varphi_0) \end{vmatrix}$$

Fig. 11

- *Procedure_2*

$\sqcap$ : Sideband selection filter (fonction of $\tau$) : lowpass filter around $\tau=0$.
Suggested (not critical): order-8 super-gaussian, FWHM $= \tau_g$ $\vec{e}(\varphi) \equiv \exp(i \cdot \varphi)$ : function defined for the sole purpose of shortening the writing $\overrightarrow{(\ )}$ : over-arrow: when the variables enclosed in the expression, e.g. $\vec{z} = \overrightarrow{(x + a \cdot y)}$, are vectors of N values, $n = 0..(N-1)$, compute the expression for each $n$, as $z_n = x_n + a \cdot y_n$. Result $z$ is a vector of N values

Input: N values $T_n$ of the sampled transmission curve $T(\nu_n)$, $n = 0..(N-1)$ $|\mathcal{T}|(T) \equiv$ $(\varphi_1\ \varphi_2\ \varphi_3\ \varphi_4) \leftarrow \varphi_{ref}(\_)$    $\leftarrow$ Call *Procedure_3* to compute phases $\varphi_\ell$ of sideband-carriers $\ell$ at each point n bidon $\leftarrow$ "Make space for side comments"

$F \leftarrow \mathcal{F}\left[\overrightarrow{\left(T \cdot \vec{e}(-\varphi_1)\right)}\right], \mathcal{T}_1 \leftarrow \mathcal{F}^{-1}\left[\overrightarrow{(\sqcap \cdot F)}\right]$ $F \leftarrow \mathcal{F}\left[\overrightarrow{\left(T \cdot \vec{e}(-\varphi_2)\right)}\right], \mathcal{T}_2 \leftarrow \mathcal{F}^{-1}\left[\overrightarrow{(\sqcap \cdot F)}\right]$ $F \leftarrow \mathcal{F}\left[\overrightarrow{\left(T \cdot \vec{e}(-\varphi_3)\right)}\right], \mathcal{T}_3 \leftarrow \mathcal{F}^{-1}\left[\overrightarrow{(\sqcap \cdot F)}\right]$ $F \leftarrow \mathcal{F}\left[\overrightarrow{\left(T \cdot \vec{e}(-\varphi_4)\right)}\right], \mathcal{T}_4 \leftarrow \mathcal{F}^{-1}\left[\overrightarrow{(\sqcap \cdot F)}\right]$ For each sideband $\ell$, $1 \leq \ell \leq 4$:
- Shift sideband $\ell$ to baseband: $T \leftarrow T \cdot \vec{e}(-\varphi_\ell)$
- Compute DFT: $F \leftarrow \mathcal{F}(T)$
- Apply sideband-selection filter: $F \leftarrow \sqcap \cdot F$
- Compute inverse DFT: $\mathcal{T}_\ell \leftarrow \mathcal{F}^{-1}(F)$ $F \leftarrow \mathcal{F}(T), \mathcal{T}_0 \leftarrow \mathcal{F}^{-1}\left[\overrightarrow{(\sqcap \cdot F)}\right]$    $\leftarrow$ The same for $\ell = 0$ ("DC" part) (but no shift, it is already around $\tau=0$)

for $n \in 0..last(T)$ $|\mathcal{T}\rangle_n \leftarrow \begin{pmatrix} \mathcal{T}^*_{4_n} \\ \mathcal{T}^*_{3_n} \\ \mathcal{T}^*_{2_n} \\ \mathcal{T}^*_{1_n} \\ \mathcal{T}_{0_n} \\ \mathcal{T}_{1_n} \\ \mathcal{T}_{2_n} \\ \mathcal{T}_{3_n} \\ \mathcal{T}_{4_n} \end{pmatrix}$ $\leftarrow$ Reshuffle the data structure into a single vector $|\mathcal{T}\rangle$ for the point n by point n calculation in *Procedure_1*

$|\mathcal{T}\rangle$

Ouput: $|\mathcal{T}\rangle$, N values $|\mathcal{T}\rangle_n$ at sampled point n, where each $|\mathcal{T}\rangle_n$ is a vector containing the 9 values $(-4 \leq \ell \leq 4)$ $\mathcal{T}_\ell(\nu_n)$ of the complex transmissions.

Fig. 12

- *Procedure_1* : Compute response vector $|m(\nu)\rangle$ from measured transmission curve $T(\nu)$

Input: T: vector of N values $T_n$ of the transmission curve, $T(\nu_n)$, at sampled points $n = 0..(N-1)$

| $Mes'(T) =$ | $\|\mathcal{T}\rangle \leftarrow \|\mathcal{T}\rangle(T)$ |
|---|---|
| | for $n \in 0..last(T)$ |
| | $\quad \|m\rangle_n \leftarrow A^{-1} \cdot \|\mathcal{T}\rangle_n$ |
| | $\|m\rangle$ |

← Call *Procedure_2* to compute the 9 complex transmissions curves $\mathcal{T}_\ell(\nu_n)$ restructured into the single vector $|\mathcal{T}\rangle$. Each $|\mathcal{T}\rangle_n$ is itself a vector containing the 9 values at point n.

← At each point n, compute $|m\rangle_n$ from $|\mathcal{T}\rangle_n$ above and matrix $A$, according to (8) and (10)

Ouput: $|m\rangle$, vector containing the N values $|m\rangle_n$ of the measured response vector.
Each $|m\rangle_n$ is itself a 4-component vector

Fig. 13

- *Procedure_0* : Computation of the PDL curve $PDL_{dB}(\nu)$ from $|m(\nu)\rangle$

Input = Output of *Procedure_1*, $|m\rangle$, a vector of N measured values $|m\rangle_n$ of the response vector

| $PDL_{dB}(\|m\rangle) =$ | for $n \in 0..last(\|m\rangle)$ |
|---|---|
| | $\quad \|m\rangle \leftarrow \|m\rangle_n$ |
| | $\quad m_0 \leftarrow \|m\rangle_0, \mathbf{m} \leftarrow [V](\|m\rangle, 1, 3)$ |
| | $\quad \Delta T \leftarrow \|\mathbf{m}\|$ |
| | $\quad T_{max} \leftarrow m_0 + \Delta T$ |
| | $\quad T_{min} \leftarrow m_0 - \Delta T$ |
| | $\quad PDL_n \leftarrow dB\left(\left|\dfrac{T_{max}}{T_{min}}\right|\right)$ if $T_{min} \neq 0$ |
| | $\quad PDL_n \leftarrow$ NaN otherwise |
| | PDL |

← select value n of $|m\rangle$
← Separate $m_0$ and $\mathbf{m} = (m_1 \ m_2 \ m_3)^T$
← Modulus of the PDL vector $\mathbf{m}$
   note: $\hat{u} = \mathbf{m} \div |\mathbf{m}|$ is the PDL axis
← Compute transmissions min and max ← Compute $PDL_n$ expressed in dB
   fonction: $dB(x) = 10 \cdot \log(x)$

Output: *PDL curve*: $PDL_{dB} = PDL_{dB}(|m\rangle)$

Fig. 14

POLARIZATION DEPENDENT LOSS MEASUREMENT

TECHNICAL FIELD

The present description generally relates to polarization dependent loss (PDL) measurement, and more particularly to measuring polarization dependent loss of a device under test using a single spectral scan.

BACKGROUND

Conventional methods for Polarization Dependent Loss (PDL) measurement include the Polarization Scanning technique and the Mueller Matrix Method.

In the Polarization Scanning technique, the Device Under Test (DUT) is exposed to virtually all States Of Polarization (SOP) and the PDL is determined from the maximum and minimum power transmission through the DUT. Because the Polarization Scanning technique needs to expose the DUT to many states of polarization, the PDL is measured at a single wavelength at a time. Measuring the PDL over a broad wavelength range can quickly become impractical.

The classic Mueller Matrix Method (see U.S. Pat. No. 5,371,597 to Favin et al.) aims at determining the first row of the Mueller matrix (4 elements) that characterizes the DUT, from which the PDL of the DUT is deduced. To this end, a lightwave having successively a small number (e.g. 4) of distinct, known input states of polarizations (SOP) is launched into the DUT, and the corresponding small number of power transmissions are measured (power of the lightwave at the output of the DUT divided by the power at the input of the DUT). To obtain the PDL characterization over wavelength, distinct wavelength scans need to be performed sequentially for each of said small number of distinct input-SOPs (minimum of 4), wherein the input-SOP is fixed (constant as a function of time) during each individual scan.

The classic Mueller Matrix Method is prone to substantial errors should the DUT be unstable over the interval between said sequential wavelength scans, e.g., due to moving patchcords, in which case the PDL measurement can be utterly wrong. A single wavelength scan approach would resolve this problem by making the SOP of the input test lightwave vary rapidly during the wavelength scan, so the DUT response to a plurality of input-SOPs would be measured at each wavelength within a much shorter time.

A method was proposed in the art (see U.S. Pat. No. 6,856,386 to Anderson) to measure the PDL based on the Mueller Matrix Method but using a single wavelength scan, by changing the input-SOP during the wavelength scan in a cyclic manner. In this method, the input-SOP can be changed using either an active or a passive device. However, one drawback of this method is that it requires that the SOP of the input test lightwave be either carefully controlled or monitored using a polarimeter and, in the case of a passive SOP generator, the combination of a polarimeter and additional polarization controller in an feedback loop, which significantly increases the difficulty of implementation, complexity and cost of the test hardware.

There therefore remains a need for an improved single wavelength scan PDL measurement method.

SUMMARY

There is herein provided a PDL measurement method which uses a new set of equations, i.e. different from that of the classic Mueller Matrix Method, as well as new data acquisition scheme and data processing to derive the PDL from a single wavelength scan (or spectral scan) over which the input-SOP varies. As explained in the detailed description, the proposed new set of equations can be viewed as a generalization of the mathematics of the Mueller Matrix Method. When compared to the classic Mueller Matrix Method, the new set of equations is applied to derive the same result, i.e., the 4-element response vector of the DUT (elsewhere referred to as the first row of the Mueller matrix) as a function of optical frequency (or wavelength), from a different data set obtained by a different data acquisition procedure, i.e., a single wavelength scan over which the input-SOP varies continuously over the scan instead of a few sequential scans with fixed SOPs.

Therefore, in accordance with one aspect, there is provided a method for measuring the PDL of a DUT as a function of optical frequency $v$ within a spectral range, which uses a single wavelength scan over which the input-SOP varies in a continuous manner, i.e. not a finite number of discrete points, but a continuous trajectory on the surface of the Poincaré sphere as a function of $v$. The power transmission through the DUT, curve $T(v)=P_{out}(v)/P_{in}(v)$ is measured during the scan, where $P_{in}(v)$ and $P_{out}(v)$ represent the power of the ligthwave at the input and output of the DUT respectively. The PDL is derived from the resolved sideband components of the power transmission curve $T(v)$ that result from the continuously varying input-SOP. More specifically, the Discrete Fourier Transform (DFT) of the power transmission curve $T(v)$ is calculated, wherein the DFT shows at least two resolved sidebands in the delay ($\tau$) domain (four in the hereindescribed embodiment), where delay $\tau$ is the conjugate variable of $v$ in the Fourier transform (the same way as signal-frequency f is the conjugate variable of time t). At least two sidebands are extracted individually, i.e. selected by applying a bandpass filter in the delay domain, and their inverse DFT calculated to obtain individual complex transmissions $\mathcal{T}_\ell(v)$, $\ell=-J\ldots J$, where J is the number of sidebands defined as the number of resolved peaks on a single side of the DFT, e.g. side $\tau>0$. The transmissions $\mathcal{T}_\ell(v)$ are complex in the sense that they are complex numbers (real and imaginary parts, or equivalently, amplitude and phase). The 4-element response vector $|m(v)\rangle$ of the DUT, elsewhere referred to as the first line of the Mueller matrix, is derived from the complex transmissions $\mathcal{T}_\ell(v)$ and a matrix $\mathcal{A}$ that represents a system of equations to be solved. As well known, a system of equations can be advantageously solved by arranging the known coefficients into a matrix, and inverting said matrix. In the context of RSB, said matrix $\mathcal{A}$ only depends on the continuous trajectory of the input-SOP (continuous curve on the surface of the Poincaré sphere). Matrix $\mathcal{A}$ thus constitutes a generalization of the corresponding matrix A of the classic Mueller Matrix Method which similarly represents a system of equations and only depends on the finite number of known discrete input-SOPs. Of note is that neither matrix A nor $\mathcal{A}$ is the Mueller matrix; the Mueller matrix characterizes a DUT, thus is independent of any particular set of input-SOPs. Finally, the PDL of the DUT as a function of $v$ (PDL curve) is derived from said response vector in the same way as in the classic Mueller Matrix Method.

The provided method allows for asynchronous sampling of the power transmission curve $T(v)$ with respect to the variation of the input-SOP, i.e. the sampled points do not need to fall on specific input-SOPs. This property allows to circumvent the need for monitoring the input-SOP with a polarimeter in the case of an active SOP generator (see active SOP generator approach of U.S. Pat. No. 6,856,386), or to additionally control the SOP through a feedback loop in the case of a passive SOP generator (see passive SOP generator approach of U.S. Pat. No. 6,856,386).

Accordingly, measuring the power transmission curve T(ν) comprises data sampling that is allowed to be asynchronous with respect to the SOP variation of the input test lightwave, i.e. the sampled points do not need to fall on a pre-determined set of input-SOPs, and consequently, the most usual and simple kind of sampling can be performed, i.e. sampling at equal intervals dν between successive samples, regardless of the input-SOP at the values of ν corresponding to the samples.

The phase of the SOP of the input lightwave along the continuous trajectory, i.e. where exactly along the trajectory is the point that represents the SOP at a given value of ν, may be either known or measured at each sampled point.

In the provided method, said phase can be measured live through appropriate data processing of the output of a single polarizer (referred to as the phase reference signal $P_\varphi$ in the detailed description), no need for a full polarimeter nor additional polarization controller and feedback loop.

In accordance with another aspect, there is provided a method for measuring the PDL of a DUT within a spectral range. The method comprises:

generating an input test lightwave which State Of Polarization (SOP), as represented by a point on the surface of the Poincaré sphere, varies according to a continuous trajectory while being spectrally scanned over the spectral range and launching the input test lightwave into the DUT;

measuring the power transmission through the DUT, curve T(ν), during a spectral scan of the input test lightwave;

calculating a Discrete Fourier Transform (DFT) of the power transmission curve T(ν), wherein the DFT shows at least two sidebands;

extracting said sidebands and computing the inverse DFT of each said sidebands to obtain complex transmissions $\mathcal{T}_\ell(\nu)$;

computing the response vector |m(ν)⟩ of the DUT from said complex transmissions $\mathcal{T}_\ell(\nu)$ and a matrix $\mathcal{A}$ determined by the continuous trajectory of the SOP of the input test ligthwave;

deriving the spectrally-varying PDL of the DUT from said response vector |m(ν)⟩.

In accordance with another aspect, there is provided a system for implementing the provided PDL measurement method. The apparatus comprises:

a tunable light source to generate a test lightwave and spectrally scanning the test lightwave over the spectral range;

a State Of Polarization (SOP) generator for varying the SOP of the test lightwave according to a continuous trajectory on the surface of the Poincaré Sphere while the test lightwave is spectrally scanned over the spectral range, the test lightwave to be launched into the DUT;

a power transmission measurement apparatus for measuring the power transmission through the DUT;

an acquisition device for sampling values of the power transmission through the DUT during a spectral scan of the test lightwave and produce the measured power transmission curve T(ν);

a processing unit configured for:

calculating a Discrete Fourier Transform (DFT) of the power transmission curve T(ν), wherein the DFT shows at least two sidebands;

extracting said sidebands and computing the inverse DFT of each said sidebands, to obtain complex transmissions T $\mathcal{T}_\ell(\nu)$;

computing the response vector |m(ν)⟩ of the DUT from said complex transmissions $\mathcal{T}_\ell(\nu)$ and a matrix $\mathcal{A}$ determined by the continuous trajectory of the SOP of the input test lightwave;

deriving the spectrally-varying PDL of the DUT from said response vector |m(ν)⟩.

Throughout this specification, spectrally-varying values, functions and equations are expressed as a function of the optical frequency ν. It is however noted that such variation could equivalently be termed as a variation as a function of wavelength λ, where λ=c/ν or the wave number σ=ν/c. Similarly, the expressions "wavelength scan" and "spectral scan" are used interchangeably herein to denote a scan that varies the optical frequency ν and the wavelength λ of a lightwave over a spectral range.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context of its intended application.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

Further features and advantages of the present invention will become apparent to those of ordinary skill in the art upon reading of the following description, taken in conjunction with the appended drawings.

BRIEF DESCRIPTION OF THE DRAWINGS

FIG. 2 is a schematic illustrating the physical principle of a passive SOP generator, in accordance with one embodiment.

FIG. 3 is a schematic showing a passive SOP generator in accordance with one practical implementation of the principles illustrated in FIG. 2, which is based on segments of polarization-maintaining fiber.

FIG. 4 is a schematic showing a passive SOP generator in accordance with another practical implementation of the principles illustrated in FIG. 2, which is based on polarization-splitting Mach-Zehnder interferometers.

FIG. 5 is a schematic showing a passive SOP generator in accordance with yet another practical implementation of the principles illustrated in FIG. 2, which is based on all-bulk polarization-splitting Mach-Zehnder interferometers.

FIG. 11 shows a pseudocode expressing in more details Procedure_3 of the method of FIG. 10.

FIG. 12 shows a pseudocode expressing in more details Procedure_2 of the method of FIG. 10.

FIG. 13 shows a pseudocode expressing in more details Procedure_1 of the method of FIG. 10.

FIG. 14 shows a pseudocode expressing in more details Procedure_0 of the method of FIG. 10.

It will be noted that throughout the drawings, like features are identified by like reference numerals.

Figure 1B:
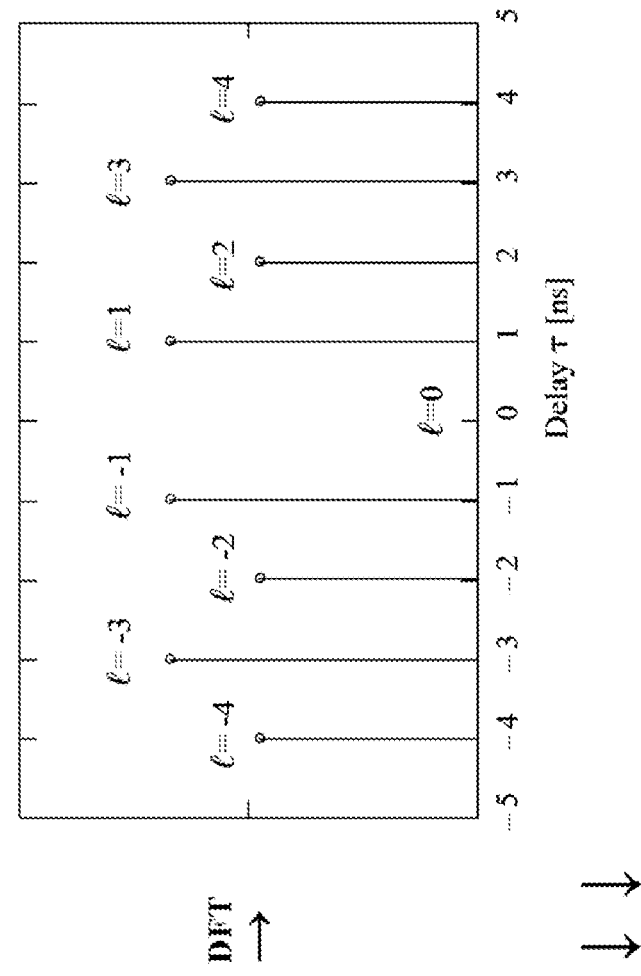
FIG. 1B is a graph showing the discrete Fourier transform of the example trajectory of FIG. 1A.

It should also be understood that when the appended drawings are denoted as schematics, elements of the drawings are not necessarily drawn to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

General Description of the Method

The present paragraph exposes a case only as an explanatory step intended to help the reader to understand the proposed method, but there is no foreseeable advantage in doing this step as such. In the classic Mueller Matrix Method, a number J of wavelength scans are performed sequentially with fixed input-SOPs, meaning that the input-SOP does not change during the scan. Now, imagine that a number J of wavelength scans are similarly performed sequentially but with input-SOPs (i.e., SOPs of the test lightwave) that, instead of being fixed SOPs, oscillate sinusoidally as a function of the optical frequency ν, e.g., describing distinct circles on the surface of the Poincaré sphere as a function of ν. Then for each scan j, j=0 . . . (J−1), we obtain a transmission curve $T_j(\nu)$ representing the response of the DUT to said oscillating SOP (instead of the response to a fixed one). Since, in the classic Mueller Matrix Method, the set of J transmission curves obtained with J fixed SOPs is enough information to deduce the desired result, it follows that the set obtained with J oscillating SOPs, thus more individual values of SOPs in a way, is also enough. Of course, deducing the result in the case of oscillating SOPs requires a new set of equations, different from the one of the classic Mueller Matrix Method.

Part of the PDL measurement method described herein can be seen as a generalization of the mathematics of the classic Mueller Matrix Method in the context of J responses to J oscillating input-SOPs instead of fixed, constant input-SOPs. In the classic Mueller Matrix Method, the 4-element response vector of the DUT, $|m(\nu)\rangle$, is obtained by solving a linear system of equations, where the four unknowns to be determined are the four elements of the response vector. As for any linear system of equations, the coefficients that multiply the unknowns in the different equations can be grouped to form a single matrix, say matrix A (not to be confused with the Mueller matrix), and the solution of the system of equations is obtained by first computing the inverse of A. In the classic Mueller Matrix Method, said matrix A only depends on, and is deduced from the known set of J fixed SOPs. In the case of oscillating SOPs as described above, it can be shown that there still exists such a matrix representing the system of equations to be solved, which is the matrix $\mathcal{A}$. Notably, it has a different number of rows, and its elements are complex numbers instead of real numbers. But the important point to note is that this equivalent matrix indeed exists and only depends on, and is deduced from the known set of, in this case, oscillating SOPs. This constitutes the main aspect of said generalization of the mathematics of the classic Mueller Matrix Method.

However, as mentioned hereinabove, there is no advantage in making J sequential scans with oscillating SOPs instead of fixed one. Indeed, the goal is to get the result using a single scan. Therefore, there is herein proposed to step up from the above explanatory case to one where the responses $T_j(\nu)$ to J oscillating input-SOPs are obtained both simultaneously and separately from a single scan. For this to be, the responses $T_j(\nu)$ should be separated as, by analogy, multiple communication channels are separated in the frequency domain. Using an input-SOP that follows a suitable continuous trajectory on the surface of the Poincaré sphere as a function of ν allows to generate responses $T_j(\nu)$ that each occupies its own band in the delay domain r around a given carrier-delay $\pm\tau_1$, $\pm\tau_2$, etc. How to generate such trajectory will become clear in the following description of embodiments. It is noted that since the power transmission curve T(ν) is a function of optical frequency ν, the abscissa of the Fourier transform of T(ν) is delay τ (not signal-frequency f) and the oscillating components of T(ν) appear as resolved sidebands in the delay domain (τ) (not the signal-frequency domain (f)).

The above explains the name given to the method, i.e. the Resolved-SideBands (RSB) method. Resolved because said sidebands are separated enough in the delay domain (τ) for the different corresponding signals, the responses $T_j(\nu)$, not to overlap. Yet more clearly, the Fourier transforms of the responses $T_j(\nu)$, which are functions of delay τ, do not overlap in the delay domain. An enlightening analogy can be made with a much more familiar case; the carriers of TV channels which should be separated enough in the frequency domain for adjacent signals spectra (in the Fourier transform of the transmitted/received electromagnetic waves) not to overlap, enough to avoid significant "crosstalk", this being determined by the required bandwidth of the signals that modulate the sinusoidal carriers. Similarly, in the RSB method, the equivalent of the time-varying signal bandwidth is the "DUT extent" in the delay domain ($\tau$), i.e. how large is the Fourier transform of the DUT transmission curve $T_{DUT}(v)$. For example, if the DUT is a narrow optical filter such as a WDM filter, the narrower $T_{DUT}(v)$, the larger its extent in the delay domain. Of course, in order to avoid "crosstalk" the spacing between the sideband-carriers are set larger than the maximum extent of the DUT that is expected to be encountered. This spacing is a characteristic of the SOP generator that one can set in accordance with the expected application of the instrument, i.e. large enough for the sidebands not to overlap for DUTs having the largest expected extent (typically DUTs that have the narrowest and/or sharpest transmission $T_{DUT}(v)$).

As in the classic Mueller Matrix Method, the result of the measurement of the RSB method is the 4-element response vector $|m(v)\rangle$ (elsewhere named first line of the Mueller matrix) as a function of optical frequency $v$. From the response vector $|m(v)\rangle$, the PDL can be derived as known in the art, in the same way as in the classic Mueller Matrix Method. The polarization-dependent center wavelength (PDCW) and the polarization-dependent bandwidth (PDBW) of the DUT can also be derived as known in the art from $|m(v)\rangle$ in cases where the DUT is such that these parameters have a defined meaning, e.g., optical bandpass filters.

It is worth mentioning that there is a formal equivalence between the mathematics of the classic Mueller Matrix Method and the mathematics of the RSB method, mainly through the existence of said equivalent matrix $\mathcal{A}$ (the matrix that represents the system of equations to be solved): the most notable difference is that, contrary to the corresponding matrix (again, not the Mueller matrix) of the classic Mueller Matrix Method, matrix $\mathcal{A}$ of RSB has complex elements (real and imaginary parts), and the measured transmission terms $\mathcal{T}_\ell (v)$, $\ell =-J \ldots J$, where J is the number of sidebands, are also complex-valued (amplitude/phase of the oscillating responses) instead of real-valued. The notation $\mathcal{T}$ is used to clearly distinguish the complex phasor $\mathcal{T}_\ell (v)$ from the real response $T_j(v)$ (real part of $\mathcal{T}_\ell (v)$). Representing such oscillating signals by complex phasors makes the mathematics of RSB much simpler and concise than would otherwise be.

The proposed PDL measurement method is now further described with reference to FIGS. 1A to 1D which are used to illustrate the oscillating components of $T(v)$ appearing as sidebands in the delay domain ($\tau$) (see FIG. 1D-1F).

Figure 1A:
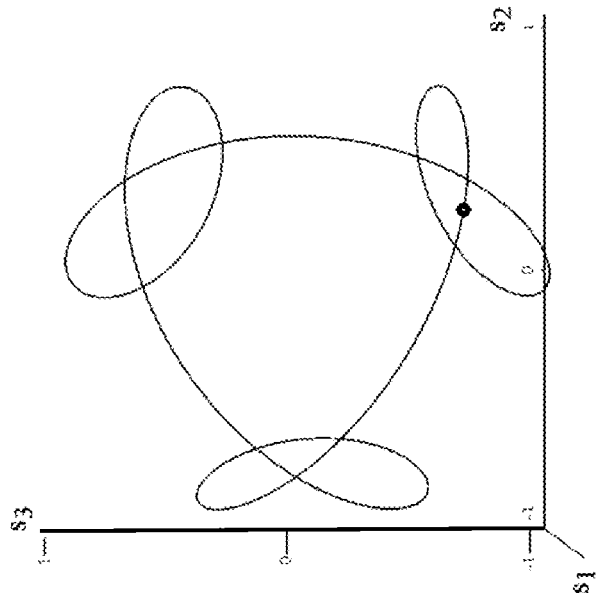
FIG. 1A is a graph showing a continuous trajectory, on the surface of the Poincaré sphere, of the SOP of an input test lightwave as a function of optical frequency ν, in accordance with one embodiment for which J=4.

FIG. 1A shows an exemplary continuous trajectory of the SOP of an input test lightwave as a function of optical frequency $v$ for which J=4. The trajectory shown in FIG. 1 is one among an infinity of possible trajectories. The SOP at a given value of $v$ corresponds to one point on the surface of the Poincaré sphere (a representation widely used in the art to depict the SOP). The position of said point is represented by the 3-element unit Stokes vector $\hat{s}(v)=(s_1(v)\ s_2(v)\ s_3(v))^\tau$, where the three coordinates $s_1$, $s_2$, and $s_3$ are the Stokes parameters. The trajectory is the overall path followed by the input-SOP on the surface of the Poincaré sphere.

FIG. 1B shows the DFT (discrete Fourier transform) of the example trajectory of FIG. 1A; since $\hat{s}(v)$ is a 3-element vector, there are in fact three such DFTs, one DFT for each of the Stokes parameters (coordinates); but to simplify, FIG. 1B regroups the three curves into a single one given by the root-mean-square value of the three DFTs at each point $v$, which suffices to illustrate the DFT of the example trajectory $\hat{s}(v)$ of FIG. 1A. In this exemplary case, the DFT consists of J=4 discrete sidebands, where J is defined as the number of discrete tones on one side of the Fourier transform (e.g. the $\tau>0$ side). Of note is that a suitable trajectory of the input-SOP for the proposed RSB method should be such that its Fourier transform shows a small number J of discrete sidebands; J=2 is the minimum because J=1 implies that the trajectory is a circle and thus all SOPs are coplanar, in which case there is no solution to the system of equations (matrix $\mathcal{A}$ is singular), J=4 is our preferred choice, and J>4 (no theoretical upper limit) is useless, and may even have indirect drawbacks in practice. As an example, if using a lot more sidebands than basically needed, then $T(v)$ has a much larger extent than needed in the delay domain. This notably implies that, when scanning $v$ at a given constant scan-speed in a practical embodiment, the photodetector electronics should have a larger bandwidth, which generally results in both a larger noise spectral-density and smaller signal-to-noise ratio for a given input power.

Because the example trajectory of FIG. 1A is periodical, the discrete sidebands in its Fourier transform are equally spaced. But the RSB method does not require a periodical trajectory, nor equal spacing of the sidebands. However, it may be more judicious in practice to target a substantially equal spacing in order to best separate the sidebands from one another within some given total delay range.

Figures 1C, 1D:
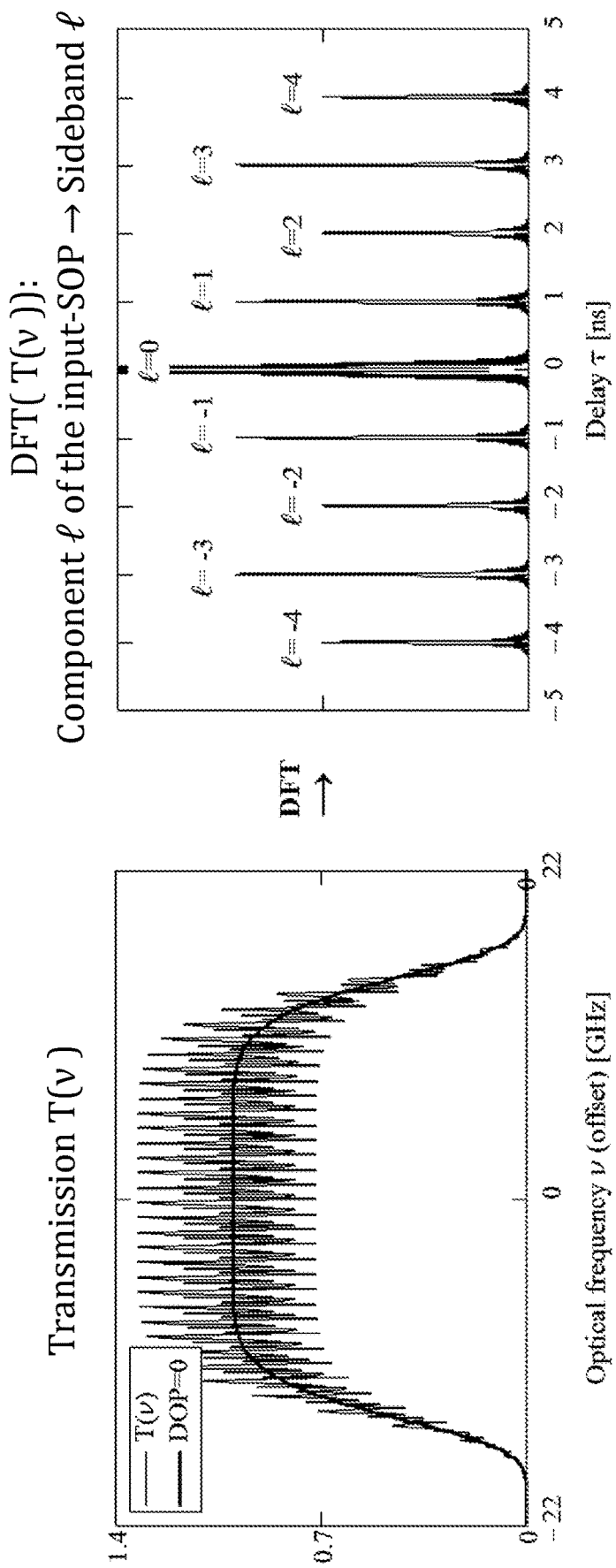
FIG. 1C is a graph showing the power transmission curve T(ν) through an example DUT, in response to the input-SOP trajectory of FIG. 1A.
FIG. 1D is a graph showing the discrete Fourier transform of the example power transmission curve T(ν) of FIG. 1C.

FIG. 1C shows the power transmission curve $T(v)$ through an example DUT, in response to the input-SOP trajectory of FIG. 1A. The example DUT is an optical filter having a passband of 30 GHz (FWHM) and a PDL of 3 dB.

FIG. 1D shows the DFT of the power transmission curve $T(v)$ shown in FIG. 1C. As seen by comparing FIG. 1B and FIG. 1D, there is a one-to-one correspondence between component $\ell$ of the SOP trajectory ($\ell =-J \ldots J$, $\ell \neq 0$) (FIG. 1B, 1E) and sideband $\Gamma$ in the DFT of $T(v)$ (FIG. 1D, 1F), located at delay values $\tau_\ell$ ($\ell =-J \ldots J$, $\ell \neq 0$). In other words, each sinusoidally oscillating input-SOP component $\ell$ (complex phasor) (FIG. 1B, 1E) generates a sideband $\ell$ around carrier-delay $\tau_\ell$ in the DFT of $T(v)$ (FIG. 1D, 1F). In the special case where the $\ell =0$ part of FIG. 1B is null, as for this example trajectory, the $\ell =0$ part of the DFT of $T(v)$ (FIG. 1D) is the DFT of the average transmission that would be measured with unpolarized input-light (smoother curve DOP=0 in FIG. 1C, where DOP means Degree of Polarization).

The Mathematics of RSB

Figure 1E:
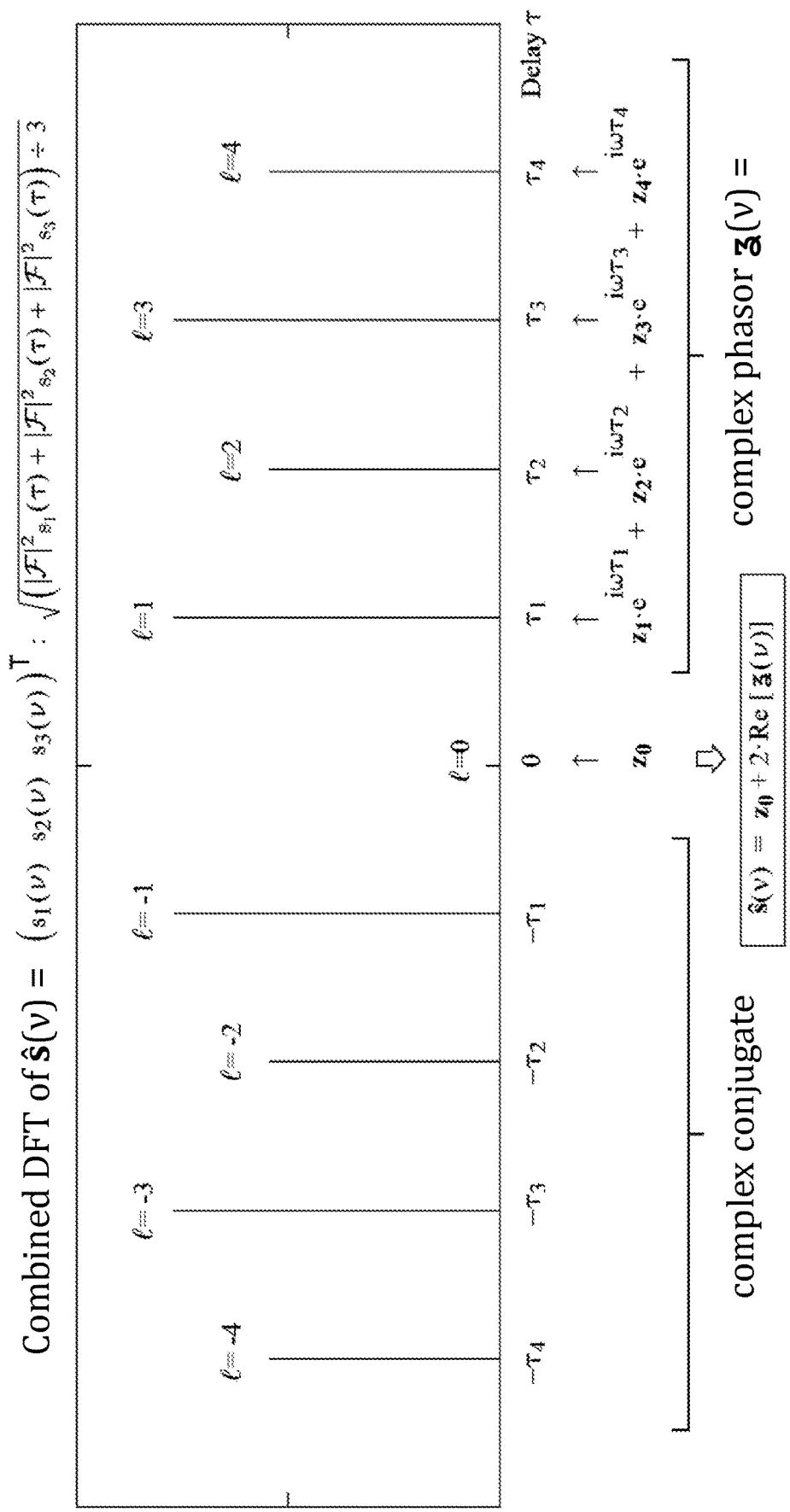
FIG. 1E is a graph showing the discrete Fourier transform of the example trajectory of FIG. 1A as shown in FIG. 1B only with additional annotations.
Figure 1F:
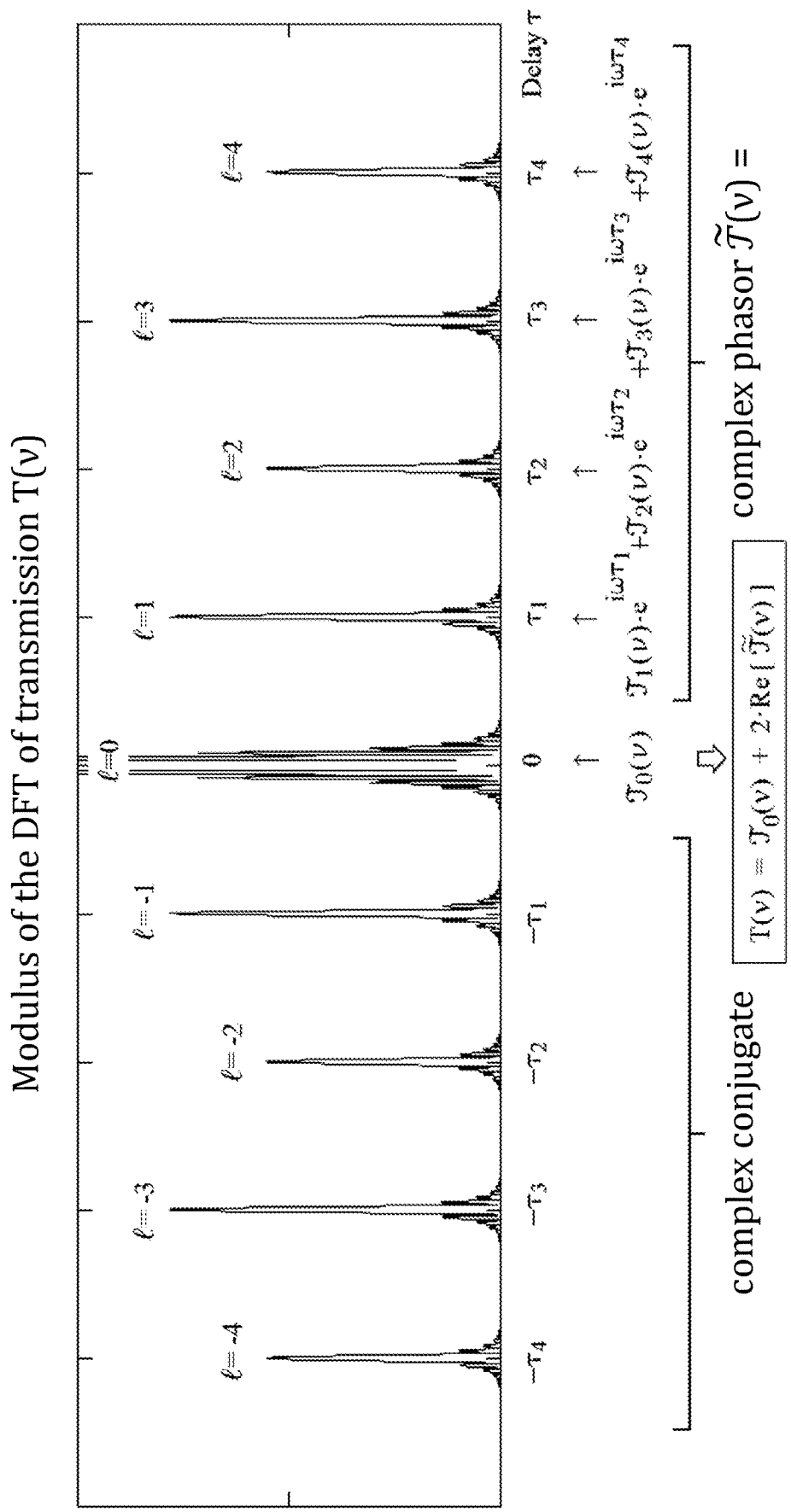
FIG. 1F is a graph showing the discrete Fourier transform of the example power transmission curve T(ν) of FIG. 1C as shown in FIG. 1D only with additional annotations.

The mathematics of RSB is now described in detail, with reference to FIGS. 1E and 1F, which are the same as FIGS. 1B and 1D but with additional annotations. Throughout this specification we conveniently use the bra-ket notation defined as follows: a ket $|v\rangle$ is a column vector that may have any number of either real or complex-valued elements, and the corresponding bra $\langle v|$ is the transposed complex-conjugate of $|v\rangle$, thus a row vector. Finally, the bracket notation $\langle v|v'\rangle$ represents the scalar product defined as, bra: $\langle v|=(v^*_0\ v^*_1\ v^*_2 \ldots v^*_{n-1})$, where * means complex-conjuguate.

ket: $|v\rangle =(v_0\ v_1\ v_2 \ldots v_{n-1})^\tau$, where $\tau$ means transposed.

scalar product: $\langle v|v'\rangle =v^*_0 v'_0+v^*_1 v'_1+v^*_2 v'_2+ \ldots +v^*_{n-1}v'_{n-1}$ Although seldom mentioned explicitly, all PDL measurement methods, including the classic Mueller Matrix Method, assume that the DUT response to an input lightwave is linear. Indeed, the Mueller matrix of the DUT is by definition a linear transformation of the input Stokes vector into the output Stokes vector. Otherwise, i.e. a non-linear DUT, the very parameter to be measured, PDL, does not even exist as commonly defined. For instance, PDL at a given value of ν would be multi-valued, notably depending on the power of the input lightwave. The RSB method makes this same basic assumption as a matter of course.

The general form of such linear response is, as far as only the transmitted power is concerned, $$T(\nu) = \langle s(\nu) | m(\nu) \rangle \qquad (1)$$

with $T(\nu) = P_{out}(\nu)/P_{in}(\nu)$, where $P_{in}(\nu)$ and $P_{out}(\nu)$ are the power of the lightwave at input and output of the DUT, $|m(\nu)\rangle = (m_0(\nu)\ m_1(\nu)\ m_2(\nu)\ m_3(\nu))^\tau$ is said response vector of the DUT measured by the method, and $\langle s(\nu)| = (1\ s_1(\nu)\ s_2(\nu)\ s_3(\nu))^\tau$ is the 4-element bra representing the 100% polarized input-SOP, where the last three elements of $\langle s(\nu)|$ are those of the 3-element unit Stokes vector $\hat{s}(\nu) = (s_1(\nu)\ s_2(\nu)\ s_3(\nu))^\tau$, $|\hat{s}(\nu)| = 1$.

Mathematical note: The most general linear transformation mapping a vector (input-SOP) to a scalar (transmission T) is by definition a scalar product, as (1) is. The response vector embodies this mapping even if Mueller-matrix calculus would not exist; this is to say that reference to the Mueller matrix is incidental, including in the classic method said of the Mueller matrix; it happens that the response vector is indeed identical to the first line of the 4×4 Mueller matrix, but this matrix is nowhere used in the calculations.

As exposed hereinabove with reference to FIGS. 1A to 1D and illustrated in FIG. 1E, a continuous trajectory $\hat{s}(\nu)$ of the input-SOP that is suitable for RSB is the sum of (2J+1) components, i.e., $$\hat{s} = \sum_\ell \mathbf{z}_\ell e^{i\omega\tau_\ell} \ (\ell = -J \ldots J),\ \mathbf{z}_\ell = (z_{\ell,1}\ z_{\ell,2}\ z_{\ell,3})^\tau \qquad (2)$$

where $\omega = 2\pi\nu$, and $\mathbf{z}_\ell$ is the complex vectorial amplitude of component $\ell$ in the DFT of the known trajectory $\hat{s}(\nu)$ of the input-SOP. Observe that $\mathbf{z}_\ell$ is a 3-element complex-valued vector; in (2), the three complex amplitudes corresponding to the three individual Stokes parameters ($s_1$, $s_2$, $s_3$) are simply wrapped up in this single, complex-valued vector. It allows to write it all in a single equation instead of three, as in (2), but also everywhere else below. Analytical expressions of the $\mathbf{z}_\ell$ for specific trajectories will be given in the description of the preferred embodiment. Of note is that the $\mathbf{z}_\ell$ can of course be measured; having analytical expressions for the preferred embodiment is convenient, but not required. Now, since response (1) is linear, one component $\ell$ of $\hat{s}(\nu)$ in (2) generates one component $\ell$ of $T(\nu)$ by mere definition of linearity, i.e., $$T(\nu) = \sum_\ell \mathcal{T}_\ell(\nu) e^{i\omega\tau_\ell} \ (\ell = -J \ldots J) \qquad (3)$$

Therefore, each component $\mathbf{z}_\ell e^{i\omega\tau_\ell}$ of $\hat{s}(\nu)$ generates one and only one term $\mathcal{T}_\ell(\nu) e^{i\omega\tau_\ell}$ in sum (3), which translates as sideband $\mathbf{z}_\ell$ around carrier-delay $\tau_\ell$ in the DFT of $T(\nu)$ as shown in FIG. 1F. Thus (1) implies that complex transmissions $\mathcal{T}_\ell(\nu)$ are given by, $$\mathcal{T}_\ell(\nu) = \langle \mathbf{z}_\ell | m(\nu) \rangle \qquad (4)$$

where $\langle \mathbf{z}_\ell|$ is the 4-element bra corresponding to $\mathbf{z}_\ell$, i.e., $$\langle \mathbf{z}_\ell| = (\delta_{\ell=0}\ z_{\ell,1}\ z_{\ell,2}\ z_{\ell,3}) \text{ where } \delta_{\ell=0} = 1 \text{ if}$$
$$\ell = 0,\ 0 \text{ otherwise.} \qquad (5)$$

Observe the presence of Kronecker symbol $\delta_{\ell=0}$ in (5). This reflects that the average over $\omega$ of an oscillating SOP component $\mathbf{z}_\ell e^{i\omega\tau_\ell}$ with $\ell \neq 0$ is null.

Equation (4) is a compact expression of a system of (2J+1) equations ($\ell = -J \ldots J$), one equation for each value of $\ell$, in which the 4 unknowns are the 4 elements of the response vector $|m(\nu)\rangle$. Also, equation (4) shows that there is one such system of equations for each value of $\nu$. This is made more apparent by writing the scalar product (4) at length in terms of the four elements of both $\langle \mathbf{z}_\ell|$ and $|m(\nu)\rangle$; one equation, i.e. for one value of $\ell$ at one value of $\nu$, then reads as, $$\delta_{\ell=0} \cdot m_0(\nu) + z_{\ell,1} \cdot m_1(\nu) + z_{\ell,2} \cdot m_2(\nu) + z_{\ell,3} \cdot m_3(\nu) = \mathcal{T}_\ell(\nu) \qquad (6)$$

which is one among a system of (2J+1) equations ($\ell = -J \ldots J$) where ($m_0(\nu)\ m_1(\nu)\ m_2(\nu)\ m_3(\nu)$) are the 4 unknowns to be determined, ($\delta_{\ell=0}\ z_{\ell,1}\ z_{\ell,2}\ z_{\ell,3}$) are the known coefficients depending only on the known continuous trajectory $\hat{s}(\nu)$ of the input-SOP, and $\mathcal{T}_\ell(\nu)$ is the measured complex transmission curve $\ell$ extracted from sideband $\ell$ in the DFT of $T(\nu)$ as exposed previously. As well known, a system of equations can be solved by arranging the known coefficients into a matrix, and inverting this matrix. In RSB, said matrix is noted $\mathcal{A}$, and following from equations (4) and (5) the system of equations at a given $\nu$ is wrapped up as, $$|\mathcal{T}(\nu)\rangle\langle\mathbf{z}_\ell| = \mathcal{A}\ |m(\nu)\rangle\langle\mathbf{z}_\ell| \qquad (7)$$

the solution of which is the measured response vector at optical frequency $\nu$, given by, $$|m(\nu)\rangle\langle\mathbf{z}_\ell| = \mathcal{A}^{-1}|\mathcal{T}(\nu)\rangle\langle\mathbf{z}_\ell| \qquad (8)$$

where $\mathcal{A}^{-1}$ is the generalized inverse of $\mathcal{A}$. For the sake of illustration, we show below the explicit expressions of $\mathcal{A}$ and $|\mathcal{T}(\nu)\rangle\langle\mathbf{z}_\ell|$ in our preferred case with J=4, and then list their relevant general characteristics:

$$\mathcal{A} = \begin{pmatrix} 0 & z_{4,1}^* & z_{4,2}^* & z_{4,3}^* \\ 0 & z_{3,1}^* & z_{3,2}^* & z_{3,3}^* \\ 0 & z_{2,1}^* & z_{2,2}^* & z_{2,3}^* \\ 0 & z_{1,1}^* & z_{1,2}^* & z_{1,3}^* \\ 1 & z_{0,1} & z_{0,2} & z_{0,3} \\ 0 & z_{1,1} & z_{1,2} & z_{1,3} \\ 0 & z_{2,1} & z_{2,2} & z_{2,3} \\ 0 & z_{3,1} & z_{3,2} & z_{3,3} \\ 0 & z_{4,1} & z_{4,2} & z_{4,3} \end{pmatrix} |\mathcal{T}(\nu)\rangle = \begin{pmatrix} \mathcal{T}_4^*(\nu) \\ \mathcal{T}_3^*(\nu) \\ \mathcal{T}_2^*(\nu) \\ \mathcal{T}_1^*(\nu) \\ \mathcal{T}_0(\nu) \\ \mathcal{T}_1(\nu) \\ \mathcal{T}_2(\nu) \\ \mathcal{T}_3(\nu) \\ \mathcal{T}_4(\nu) \end{pmatrix} \qquad (9)$$

The general characteristics of ket $|\mathcal{T}(\nu)\rangle$ are:
- $|\mathcal{T}(\nu)\rangle$ is an ordered list of all (2J+1) measured complex transmissions $\mathcal{T}_\ell(\nu)$ at $\nu$, disposed in a column vector. Thus it has (2J+1) rows=number of equations.
- Row i of $|\mathcal{T}(\nu)\rangle$ (i=0 ... 2J) is the measured $\mathcal{T}_\ell(\nu)$ with $\ell = (i-J)$.
- $\mathcal{T}_\ell^*(\nu) = \mathcal{T}_{-\ell}(\nu)$ (property used in writing equation (9), only to save data processing time)

The relevant general characteristics of matrix $\mathcal{A}$ are:
- $\mathcal{A}$ has 4 columns (number of unknowns) and (2J+1) rows (one row for each equation).
- Each row i of $\mathcal{A}$ (i=0 ... 2J) is simply the bra $\langle\mathbf{z}_\ell|$ given by equation (5) with $\ell = (i-J)$. In words, each row of $\mathcal{A}$ is one of the oscillating component of the input-SOP represented by the corresponding bra (row vector).

$$\mathbf{z}_\ell^* = \mathbf{z}_{-\ell}$$

But then $\mathcal{A}$ is not a square matrix and thus has no inverse in a strict sense, reflecting the fact that there are more equations than unknowns (more rows than columns). It is to be understood that having more equations than minimally required is by no way a drawback of any sort. Only that mathematically speaking we have to use a generalized inverse of $\mathcal{A}$, here defined as follows, $$\mathcal{A}^{-1} = B^{-1} \mathcal{A}^\dagger \text{ with } B = \mathcal{A}^\dagger \mathcal{A} \text{ († means transposed complex-conjugate)} \quad (10)$$

The response vector $|m(v)\rangle$ that RSB seeks to measure is given by equations (8) and (10).

This completes the description of the part of RSB that can be said to generalize the mathematics of the classic Mueller Matrix Method. Indeed, although the compact form of equation (11) below is seldom seen in the literature, in the normed classic Mueller Matrix Method the solution can be similarly written as, $$|m(v)\rangle = A^{-1}|T(v)\rangle \quad (11)$$

where A is a real (no imaginary part) 4×4 matrix which rows are the 4 real bras representing the 4 fixed input-SOPs, and $|T(v)\rangle$ is a 4-element vector consisting of the 4 real transmissions, measured at the same v but obtained sequentially in time (i.e. one distinct scan for each fixed input-SOP, one after the other). So written, equations (8) and (11) are found to be formal mathematical equivalents.

Finally, to make sure that a possible misunderstanding is avoided: A and $\mathcal{A}$ are indeed matrices, involved in the calculations of their respective methods, but neither of them is the Mueller matrix. The name Mueller Matrix Method may be misleading for that matter, since the full Mueller matrix is nowhere used in the calculations, only its "first line", thus a much simpler vector which we name response vector, whereas indeed a matrix is involved, matrix A, be it explicitly or implicitly (solving a system of equations).

In some embodiments, a suitable trajectory of the input-SOP as a function of v as described hereinabove is generated using a passive SOP generator. Such a passive SOP generator advantageously generates by laws of Physics a trajectory showing the desired small number of sidebands (J=2, 3 or 4). However, in other embodiments, suitable trajectories of the input-SOP may be generated by using an actively controlled SOP generator. Such actively controlled SOP generators are generally known in the art and commercially available and will therefore not be herein described in detail. Actively controlled SOP generators are also much more complex, bulky and costly.

Passive SOP Generator

FIG. 2 shows a passive SOP generator in accordance with one embodiment that is used to illustrate the physical principle. The passive SOP generator is based on a two-segment PMD emulator, abbreviated as the 2-segs from hereon. A single segment is not enough for generating a suitable trajectory (because then J=1), whereas more than two is unnecessary. As illustrated in FIG. 2, an input polarized ligthwave (i.e. the output of a spectrally scanned polarized light source) successively passes through a first segment $Seg_0$ and a second segment $Seg_1$. Each segment $Seg_0$, $Seg_1$ is characterized by a Principal State of Polarization (PSP) that is constant as a function of v and a Differential Group Delay (DGD) that may or may not be constant over the relevant spectral range but is herein assumed constant for simplicity. Each segment $Seg_0$, $Seg_1$ acts as a 3D rotation on the 3-element Stokes vector that represents the SOP. The rotation is characterized by a fixed rotation axis p (the PSP) and a rotation angle φ (phase), that varies linearly as a function of v, which slope is the DGD (more precisely, DGD=dφ/dω, where ω=2πv). The output-SOP ŝ(v) is thus given by the product of these two rotations applied to the input-SOP $\hat{s}_o$. In one embodiment, the first and second segments are embodied by pieces of Polarisation Maintaining Fibers (PMFs). Referring to FIG. 2, the input-SOP $\hat{s}_o$ and the PSPs $p_0$, $p_1$ of respective segments $Seg_0$, $Seg_1$ are 3-element unit Stokes vectors. The DGDs of segments $Seg_0$, $Seg_1$ are respectively noted $\delta\tau_0$ to and $\delta\tau_1$. The coupling angles $\varphi_{\hat{s}o}$ and $\varphi_p$ are respectively the angle between $\hat{s}_o$ and $p_0$ and the angle between $p_0$ and $p_1$. Parameter r is the ratio of the DGD $\delta\tau_0$ of segment $Seg_0$ over the DGD $\delta\tau_1$ of segment $Seg_1$. The 2-segs may be designed to obtain a ratio r that is substantially an integer value such as 1, 2 or 3, so as to advantageously obtain substantially equally-spaced sidebands. There is however no requirement that the ratio r be a strictly integer value.

A 2-segs always generate 4 sidebands, located at delay values $\delta\tau_0$, $\delta\tau_1$, $(\delta\tau_0+\delta\tau_1)$ and $(\delta\tau_0-\delta\tau_1)$ in the delay domain. This implies that for ratios like r=1 and 2 some of the four are superimposed (located at the same delay value). Thus, the number of distinct (not superimposed) sidebands in the Fourier transform of the transmission T(v) depends on the ratio r. For example, an integer ratio r≥3 will generate J=4 distinct sidebands, a ratio r=2 will generate J=3 distinct sidebands and a ratio r=1 will generate J=2 distinct sidebands only. In other words, both the number J and relative locations of the distinct sidebands, at delay values referred to as $\mathcal{T}_\ell$ ($\ell = -J \ldots J$, $\ell \neq 0$) in this specification, depend on the ratio r of the 2-segs.

In one embodiment, the passive SOP generator is designed with a ratio r~3, which advantageously generates J=4 substantially equally spaced sidebands, and the targeted coupling angles are $\varphi_{\hat{s}o}$ 90° and $\varphi_p$=90°. Almost any other coupling angles may be used, except 0° or 180°, but the above-mentioned choice minimizes the sensitivity of the measurement to both additive noise and uncertainty on the knowledge of the actual coupling angles.

FIG. 3 shows a passive SOP generator 300 in accordance with one practical implementation of the 2-segs of FIG. 2 which is based on PMF fibers only. The passive SOP generator 300 comprises two concatenated pieces of PMF 302, 304 and an input polarizer 306. It also comprises an optional phase reference arm 310.

The input polarizer 306 sets the SOP at the input of the first piece of PMF 302, and thus the coupling angle $\varphi_{\hat{s}o}$. The two pieces of PMF 302, 304 are fused at an angle $\varphi_p$ between their respective PSPs ($p_0$ and $p_1$). Of note is that the specific values of the coupling angles $\varphi_{\hat{s}o}$ and $\varphi_p$ are not critical in the sense that no high precision alignment is required, as long as the actual angles are known or determined afterwards. The actual coupling angles $\varphi_{\hat{s}o}$ and $\varphi_p$ can be determined afterwards through a calibration process, e.g. using a polarimeter.

Respective lengths of PMF pieces 302, 304 determine the value of their DGDs $\delta\tau_0$, $\delta\tau_1$, thus also the ratio r. Here again, there is no high precision requirement in cutting the PMF pieces to a given length. The two DGDs may be effectively measured live through appropriate data processing of the phase reference signal $P_\varphi(v)$. More to the point, the two effective DGDs determine the phase of the SOP of the input lightwave along the trajectory, i.e. where exactly along the trajectory is the point that represents the SOP located at a given value of ν. This phase may be either known or measured at each sampled point. One may target design values of angles $\varphi_{\hat{s}o}$ and $\varphi_p$, DGD $\delta\tau_0$ and DGD $\delta\tau_1$ with reasonable care, but the true angles and DGDs after assembly do not need to be precisely equal to the design values.

The phase reference arm 310 comprises a coupler 308 used to extract a small portion of the light at the output of the second PMF piece 304 toward a polarizer 312 (analyzer â) followed by a photodetector 314, which output constitutes a phase reference signal $P_\varphi(\nu)$. This phase reference signal would not be needed in a perfect world where the DGDs and corresponding phases $\varphi_0(\nu)$, $\varphi_1(\nu)$ (see FIG. 2) would be exactly known. In a real non-ideal world, the phase reference serves the following purpose: from the sampled signal $P_\varphi(\nu)$, said phases $\varphi_0(\nu)$, $\varphi_1(\nu)$ (angles of rotation) are deduced at each sampled point of the spectral scan through appropriate data processing. There is therefore no need for the DGDs to be accurately known in advance, infinitely stable and constant as a function of ν. It is noted that the input polarizer 306 and phase reference arm 310 may be made of bulk components or optical fiber components (i.e. polarizers, coupler or beamsplitter).

The angle $\varphi_{\hat{a}}$ between â and $p_1$, or in words between the analyzer axis and the PSP of the second PMF piece 304, is set by rotating polarizer 312 (or by an angular fusion splice between the second PMF piece 304 and the PMF-fiber pigtail of the polarizer 312). In practical embodiments $\varphi_{\hat{a}}$ is set to roughly 45° (not critical, but it should not be 0°, 90° or 180°, because then either one of the oscillating components of the signal $P_\varphi(\nu)$ that are analyzed in the data processing to measure said phases live would have zero amplitude).

It is noted that, although simple, the embodiment of FIG. 3 may suffer from a non-negligible drawback is some cases. It will be understood that the narrower the DUT transmission curve in the optical frequency ν domain, the broader the extent of its Fourier transform in the delay τ domain. Therefore, if the intended application should allow DUTs having a large extent in the delay τ domain, such as narrowband WDM filters for example, the DGDs of the PMF pieces 302, 304 may need to be at least $\delta\tau_1 \sim 1$ ns and $\delta\tau_0 \sim 3$ ns (assuming r=3). Since the DGD per unit length of a typical Panda fiber is about 1.5 ps/m, the lengths of the PMF segments would be respectively 0.67 and 2.0 km, for a total of 2.67 km. Such length of PMF can be exceedingly expensive.

But larger DGD values, e.g. in the nanoseconds order of magnitude or even greater if needed, may be obtained by replacing the PMF pieces 302, 304 by devices 402, 404 which may be named Polarization-Splitting Mach-Zehnder interferometers PS_MZ.

FIG. 4 shows a passive SOP generator 400 in accordance with another practical implementation of the 2-segs of FIG. 2, which is based on such PS_MZs. This bulk-and-fiber PS_MZ embodiment overcomes the above-mentioned drawback of the all-fiber embodiment of FIG. 3. The optical path is split in two arms and then recombined using two Polarization Beam Splitters (PBS) 416. For each PS_MZ devices 402, 404, a path length difference (delay) between the two arms is set by a piece of fiber 418 inserted in one of the arms, preferably a piece of PMF fiber in order to minimize and stabilize the effective loss of the corresponding arm. The DGD of each PS_MZ device 402, 404 is equal to the delay between the two arms, which is roughly equal to the path length of said piece of PMF fiber. For example, a 3-ns DGD may be obtained using a PMF length of about 60 cm for a typical fiber with a refractive index of 1.5, which is indeed much less than the 2 km needed in the embodiment of FIG. 3. The PSP is determined by the polarization axis of the PBSs. Multiple collimating lenses used along the optical paths are denoted $c_1$ to $c_8$.

The passive SOP generator 400 also comprises an optional phase reference arm 410. As in the embodiment of FIG. 3, a small proportion of the light at the output of the second PS_MZ device 404 is extracted by a coupler 408 toward polarizer 412 followed by photodetector 414 which output constitutes the phase reference signal $P_\varphi(\nu)$.

The coupling angle $\varphi_{\hat{s}o}$ is set by rotating the assembly comprising the input polarizer 406 and collimator $c_0$. The coupling angle $\varphi_p$ is set by the angled fusion between the two pieces of PMF 420, 422 attached respectively to collimators $c_3$ and $c_4$. The PSP of each of these two pieces of PMF 420, 422 is aligned with the polarization axis of the PBS that faces the collimator to which they are attached.

The angle $\varphi_{\hat{a}}$ between â and $p_1$, or in words between the analyzer axis and the PSP of the second PS-MZ, is set by rotating polarizer 412.

The lengths of the PMF pieces 418 (denoted $PMF_0$ and $PMF_1$) mainly determine the DGDs of the two PS_MZs 402, 404: $\delta\tau_q \sim nL_q/c$, wherein $L_q$ is the PMF length and n is the mean group index of the fiber (~1.5). For an accurate pre-calculation of the lengths before cutting the fibers, the small light path lengths in air, into the PBSs and into the collimator lenses should be taken into account. It is noted that the use of PMFs in the PS_MZ 402, 404 is optional although advantageous to properly align the polarization that comes out of the first PBS with the polarization axis of the second PBS, in order to minimize and stabilize the loss of this path (a misalignment has no other adverse effect).

Collimators $c_3$ and $c_4$ and their attached pieces of PMF are inserted for the purpose of simplifying the assembly. The two assemblies constituting the two PS_MZ 402, 404 may then be mounted on a single plane. Otherwise there should be two planes making an angle $\theta = \varphi_p/2$ (see FIG. 5).

FIG. 5 shows a passive SOP generator 500 in accordance with another practical implementation of the 2-segs of FIG. 2, which is based on all-bulk PS_MZs.

The passive SOP generator 500 comprises two all-bulk PS_MZs 502, 504. The optical path is split in two arms and then recombined using two Polarization Beam Splitters (PBS) 516. For each PS_MZ 502, 504, a path length difference (delay) between the two arms is set by a free-space optical path that is made longer in one of the arms 518, using a mirror arrangement. The DGD of each PS_MZ 502, 504 is equal to the delay between the two arms. The passive SOP generator 500 also comprises an input polarizer 506, and again, as in the embodiment of FIG. 3, a small proportion of the light at the output of the second PS_MZ 504 is extracted by a beam splitter 508 toward a phase reference arm 510 which output is the phase reference signal $P_\varphi(\nu)$.

The coupling angle $\varphi_{\hat{s}o}$ is set by rotating the input polarizer 506. The coupling angle $\varphi_p$ is set by rotating the mounting plane of the second PS_MZ 504 (normal $\hat{u}_1$) with respect to the mounting plane of the first PS_MZ 502 (normal $\hat{u}_0$). The angle θ between normal $\hat{u}_1$ and normal $\hat{u}_0$ is $\theta = \frac{1}{2}\varphi_p$ (θ represents the physical angle between the normal vectors of two planes, whereas the coupling angles φ refer to angles between Stokes vectors such as $\hat{s}_o$, $p_0$, $p_1$, â; Stokes vectors are not limited to representing linear polarizations; when linear SOPs are involved, a corresponding physical angle do exists, but equal to half the angle between the Stokes vector).

It is noted that the two PS_MZs 502, 504 may alternatively be mounted on the same plane by inserting a retardation waveplate (λ/2) in-between. The coupling angle $\varphi_p$ is then set by rotating the waveplate. Although apparently convenient, there is a drawback; waveplates that would be substantially achromatic (constant retardation as a function of ν) over a very large scanning range (e.g. from 1250 to 1650 nm) are rare and exceedingly expensive.

It will be understood that the above-described implementations of the passive SOP generator may be varied by mixing portions thereof. For example, the phase reference arm 310 or 410 may be replaced by the bulk phase reference arm 510 and vice versa. The bulk delay lines 518 of the all-bulk embodiment 500 may also be replaced by segments of PMF and associated collimator lenses $c_1$-$c_2$, $c_5$-$c_6$ as in the bulk and fiber embodiment 400.

Measurement System

Figure 6:
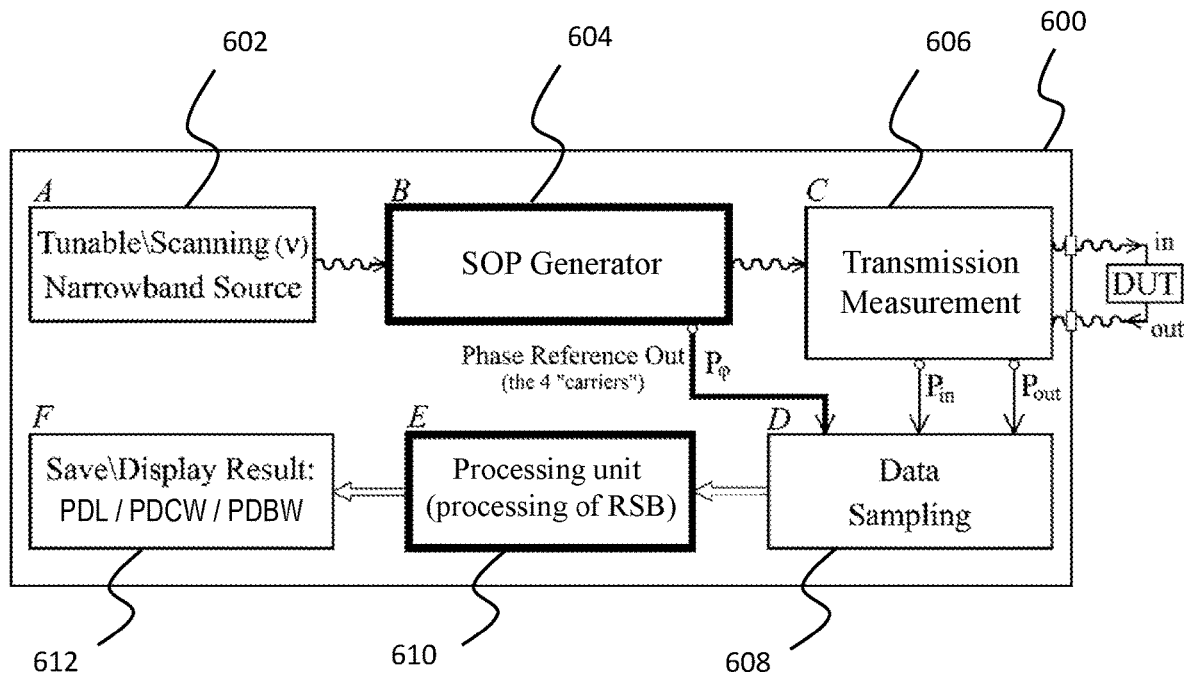
FIG. 6 is a block diagram showing a PDL measurement system in accordance with one embodiment which employs a single spectral scan and a passive SOP generator.

FIG. 6 shows a PDL measurement system 600 in accordance with one embodiment which employs a single spectral scan and a passive SOP generator.

It should be noted that the RBS method, notably its new mathematics (see equations (1) to (10)) constituting a generalization of the mathematics of the classic Mueller Matrix Method, is more general than this embodiment, is not limited to this embodiment and does not require data to be acquired using a single wavelength scan. It rather allows dealing optimally with this much more challenging case. Data may as well be acquired using multiple scans sequentially in time with different oscillating SOPs, and whether the SOP generator is active or passive. The PDL measurement system 600 is still mostly advantageous compared to the classic Mueller Matrix Method in that the PDL can be derived from a single wavelength scan over which the input-SOP continuously varies instead of a few sequential scans with fixed SOPs.

The PDL measurement system 600 comprises a tunable light source 602, an SOP generator 604, a power transmission measurement apparatus 606, an acquisition device 608 (also referred to as data sampling), a processing unit 610 implementing the RSB data processing, a data output 612 for displaying, saving in memory or otherwise outputting the measurement results.

The tunable light source 602 generates a test lightwave and spectrally scans the test lightwave over the spectral range over which the PDL is to be measured.

The SOP generator 604 is used to vary the SOP of the test lightwave according to a continuous trajectory on the surface of the Poincaré sphere while the test lightwave is spectrally scanned, before the test lightwave is launched into the DUT. Although, as explained hereinabove, passive SOP generators offer many advantages, in some implementations it may still be chosen to use an active SOP generator.

The power transmission measurement apparatus 606 measures the power of the ligthwave at both the input and output of the DUT, i.e. $P_{in}(\nu)$ and $P_{out}(\nu)$ respectively, so that the transmission through the DUT, $T(\nu)=P_{out}(\nu)/P_{in}(\nu)$, can be computed.

The acquisition device 608 simultaneously samples values of $P_{in}(\nu)$, $P_{out}(\nu)$ and optionally $P_\varphi(\nu)$ during a spectral scan of the test lightwave.

The processing unit 610 computes the power transmission curve $T(\nu)$ from the sampled power $P_{in}(\nu)$ and $P_{out}(\nu)$ as $T(\nu)=P_{out}(\nu)/P_{in}(\nu)$, and processes said computed curve $T(\nu)$ and optional phase reference output $P_\varphi(\nu)$ in accordance with the RSB method to derive therefrom the spectrally-varying PDL of the DUT.

The data output 612 outputs the measured characteristics which, in addition to the spectrally-varying PDL may include the polarization-dependent center wavelength (PDCW) and the polarization-dependent bandwidth (PDBW) of the DUT.

Tunable Light Source

The tunable light source 602 generates a test lightwave and spectrally scans the test lightwave over the spectral range over which the PDL is measured. The tunable light source 602 may be based on a tunable narrowband single-mode laser or, alternatively, a broadband light source (e.g. a super-LED) followed by a tunable optical filter (also named "monochromator").

It will be understood that the term "single-mode" intends to comprise a laser source which output spectrum substantially consists of a single peak, which peak always has some finite width in practice, the laser linewidth.

The term "narrowband" refers to said laser linewidth. In the case of the broadband source and optical filter embodiment, in refers to the width of the passband of the optical filter. The maximum acceptable linewidth depends on the intended application as it determines the minimal spectral resolution of the measurement. For example, the characterization of a broadband DUT, having a constant SOP-averaged transmission and constant PDL over a large range of ν, is less stringent on the linewidth than other DUTs including WDM optical filters having a 3-dB bandwidth as small as 25 to 30 GHz. To give some figures: for example, in the case of the passive SOP generator described hereinabove for which the DGDs of the 2 segments are $\delta\tau_0$~3 ns and $\delta\tau_1$~1 ns (case r=3), which are large enough for said DUTs to be measured with negligible crosstalk between the sidebands, the resulting extent of $T(\nu)$ in the delay domain requires that the laser linewidth be smaller than about 10 MHz (but up to 5 times this value may be acceptable if a compensation of the lowpass filtering effect of the finite laser linewidth is applied by the data processing based on the knowledge of the laser lineshape).

The term "tunable" intends to mean that the optical frequency ν of the laser or the center optical frequency ν of the tunable filter passband in the broadband source alternative, can be set to a plurality of values over the spectral range of the measurement. The spectral range may be determined by the application or be selected by the user depending on the spectral range over which the PDL of the DUT is to be characterized. In any case, the RSB method requires (to obtain a single point of PDL(ν)) that the spectral range at least covers about one cycle of the SOP trajectory (e.g. ~1 GHz for $\delta\tau_1$=1 ns).

The spectral scan typically involves that, starting from a given initial optical frequency $\nu_o$ at t=0, the optical frequency ν is tuned to increase or decrease in a substantially continuous manner as a function of time t and with a substantially linear variation as a function of t, i.e. $\nu(t)=\nu_o+\nu_s t$, where $\nu_s$ is the scanning speed. Such spectral scan may be obtained using what is widely referred to as a "swept-wavelength system", which allows to sample data over a very large number of values of ν in a very swift way. It is however noted that such continuous scan is not necessarily required by RSB. Indeed, data could as well be acquired by varying the optical frequency ν in a random order, then re-ordered in ascending order afterward, as long as the power transmission T(ν) of the DUT is obtained as a function of ν. But in practice, it is obviously more convenient to proceed with a continuous scan.

That being said, in practice, sampling data ($P_{in}(\nu)$, $P_{out}(\nu)$, $P_\varphi(\nu)$) with a constant step dν in optical frequency or re-sampling in the data processing (using interpolation) to obtain such constant step dν, allows computing the Discrete Fourier Transforms (DFT) using the Fast Fourier Transform algorithm (FFT), although a very much slower general DFT computation does not require the samples to be equally spaced.

Power Transmission Measurement

The power transmission measurement apparatus 606 splits the incoming ligthwave in two paths for the purpose of measuring the power of the ligthwave at both the input and output of the DUT, i.e. $P_{in}(\nu)$ and $P_{in}(\nu)$ respectively, so that the transmission through the DUT, $T(\nu)=P_{out}(\nu)/P_{in}(\nu)$, can be computed afterward. Power transmission measurement apparatuses commonly used in the classic Mueller Method, or in simpler insertion loss measurements, may be used for this purpose.

Figures 7A, 7B:
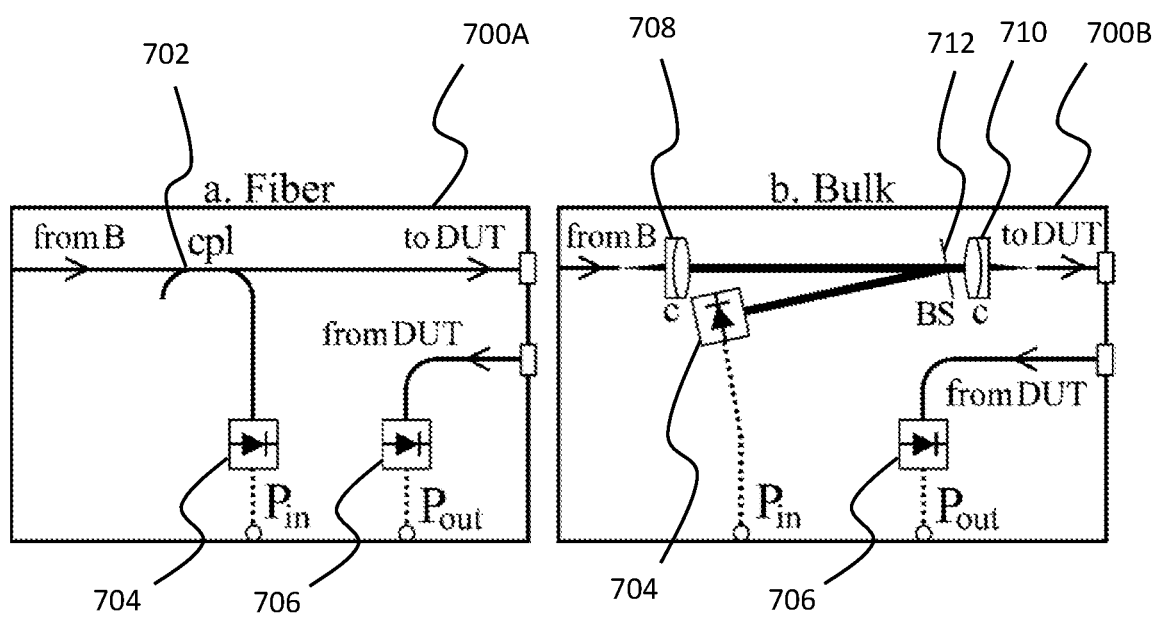
FIG. 7A is a schematic showing a power transmission measurement apparatus in accordance with an embodiment which is all-fiber based.
FIG. 7B is a schematic showing a power transmission measurement apparatus in accordance with another embodiment which is based on bulk components.

FIG. 7A shows a power transmission measurement apparatus 700A in accordance with an all-fiber embodiment. FIG. 7B shows a power transmission measurement apparatus 700B in accordance with a bulk embodiment. In either cases, the apparatus 700A/700B is configured to measure both the optical power $P_{in}$ of the test lightwave at the input of the DUT and the optical power $P_{out}$ of the test lightwave at the output of the DUT to allow calculation of the power transmission $T=P_{out}/P_{in}$.

The power transmission measurement apparatus 700A comprises an optical fiber power coupler 702, which may consist of a singlemode fiber coupler, to extract a portion of the input test lightwave toward a first photodetector 704 in order to measure values of input optical power $P_{in}$. A second photodetector 706 received the test signal lightwave at the output of the DUT to measure values of output optical power $P_{out}$.

The power transmission meaurement apparatus 700B is similar to apparatus 700A but for the optical fiber coupler 702 that is replaced by a bulk beam splitter 712 and a pair of collimating lenses 708, 710.

Acquisition Device

Figure 8:
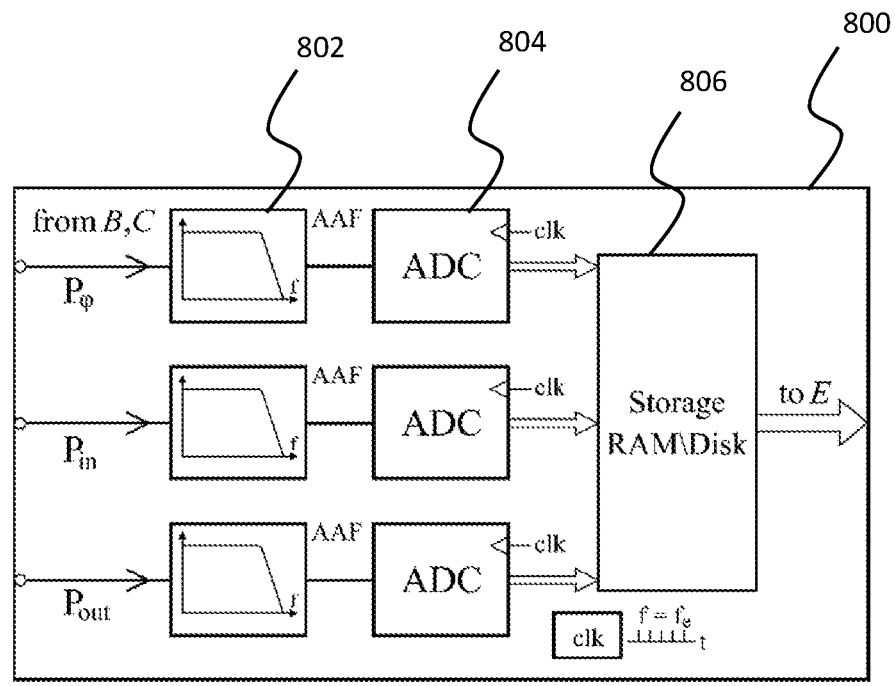
FIG. 8 is a schematic showing an acquisition device in accordance with one embodiment.

The power transmission curve T(ν) is obtained by sampling both $P_{out}$ and $P_{in}$ while scanning the optical frequency ν. Data Sampling can be applied using conventional data sampling. FIG. 8 shows an acquisition device 800 in accordance with one embodiment using such conventional sampling. Each signal $P_\varphi$, $P_{in}$, $P_{out}$ to be sampled, is filtered using an Anti-Aliasing Filter (AAF) 802 and sampled using an Analog-to-Digital Converter (ADC) 804. Data samples are cumulated in memory 806.

Delay Scale (τ), signal-frequency scale (f) and sampling frequency ($f_e$)

Referring to the FIG. 1D, the signals to be sampled correspond to a given extent of the DFT of the transmission curve T(ν) in the delay domain, which is independent of the scan speed $v_s$. When performing a spectral scan with a constant scan speed, the extent of the sampled signal in the signal-frequency (f) domain (single-sided bandwidth) depends on both the extent of T(ν) in the delay domain and the scan speed $v_s$ (the mapping is $f=v_s \tau$). Defining the following:

$\tau_+$: total extent of T(ν) in the delay domain, containing all sidebands (e.g. 4 in the example where $\delta\tau_0=3$ ns and $\delta\tau_1=1$ ns);

$\tau_g$: spacing between sidebands (e.g. 1 ns in the example where $\delta\tau_0=3$ ns and $\delta\tau_1=1$ ns);

$f_+$: extent of the signal-frequency scale containing all sidebands;

$f_e$: sampling frequency

Assuming for example $\delta\tau_0=3$ ns and $\delta\tau_1=1$ ns, then with r=3, the total extent in the delay domain, $\tau_+$, is about 5 times the spacing $\tau_g$ between sidebands ($\tau_+ \sim 5\tau_g$). Since $f_+=v_s\tau_+$, then $f_+ \sim 5 v_s\tau_g$. To avoid aliasing artefacts, the sampling frequency should be $f_e \geq 2 f_+$. Therefore, if $v_s=10$ THz/s for example, i.e. $v_{s,\lambda} \sim 80$ nm/s@λ=1550 nm, then $f_+=50$ kHz and $f_e$ should be greater than 100 kHz.

The following care should be taken regarding the anti-aliasing filter 802. It is a well-known and good practice to limit the bandwidth of the signal (including wideband noise and/or high-frequency spurious) before sampling. But here, care should be taken to make the filter response substantially flat over the range $-f_+$ to $f_+$ because any attenuation of the sidebands by the anti-aliasing filter 802 will result in a bias on the measured PDL. Indeed, the PDL is directly represented by the amplitude of the sidebands (relative to the mean DC part). So only 1% attenuation translates directly to roughly −1% bias. A good choice in that case may be a second-order filter which gives a flat response over a large range relative to its 3-dB cut frequency.

Care should also be taken to sample all signals ($P_\varphi$, $P_{in}$, $P_{out}$) synchronously (negligible delay between them). Of course, the requirement becomes more stringent as the scan speed increases.

Analytical Expression of Matrix $\mathcal{A}$

Before describing the RBS processing in detailed steps, it is worth exposing an analytical expression of matrix $\mathcal{A}$ that may be implemented in the algorithm in the case of embodiments using the passive SOP generator. Remind that matrix $\mathcal{A}$ represents the system of equations to be solved by the RSB processing in accordance with equation (8), and only depends on the known trajectory of the input-SOP as stipulated by (9). Yet more precisely, what is given below in equations (13) are analytical expressions of the complex vectorial amplitudes $Z_\ell$ that appear in the general expression (9) of matrix $\mathcal{A}$.

The trajectory ŝ(ν) of the SOP at the output of the 2-segs of the passive SOP generator, which is characterized by said complex vectorial amplitudes $Z_\ell$ as specified in (2), only depends on two parameters, the two coupling angles $\varphi_{\hat{s}_o}$ and $\varphi_p$, or equivalently the three governing Stokes vectors $\hat{s}_o$, $p_0$ and $p_1$. Remind that $\hat{s}_o$ is the SOP at the input of the 2-segs, whereas $p_0$ and $p_1$ are the PSPs of first and second segment respectively. Said analytical expressions of the $Z_\ell$ given below derive from the laws of Physics. The specific set of equations (13) assumes that the following conditions are met:

1) r≥2.5, where r is the ratio of the DGDs of the first and second segment of the 2-segs ($r=\delta\tau_0/\delta\tau_1$). Then the number of sidebands is J=4. Remind that the above embodiment targets r=3;

2) The three governing Stokes vectors, $\hat{s}_o$, $p_0$ and $p_1$, are coplanar; this condition is easily met in practice with virtual perfection if the corresponding SOP and PSPs are each simply set by the polarization axis of a linear polarizer or PBS, or the PSP of a PMF fiber, as in all embodiments of the passive SOP generator shown previously in FIGS. 3, 4 and 5. For the setup of FIG. 4 however, care must be taken to ensure that the PSPs of the two accessory pieces of PMF 420, 422 inserted between the two PS_MZ for production convenience (both PS_MZ on a single plate) are as specified in hereinabove, i.e. properly aligned with the polarization axes of the corresponding PBSs (say within 1° for the above statement of virtual perfection to still hold).

Notes a) If 1≤r<2.5, the number of distinctly-resolved sidebands and their order/disposition in the delay domain τ differ from what is shown in FIG. 1. However, it does not mean that ratios such as r=1 or r=2 cannot be targeted if one finds some advantage to it. The embodiments herein described in details target r=3, but other cases such as r=2 or r=1 are possible, but more complicated. It is considered within the reach of one skilled in the art to derive analytical expressions of the $\mathbf{Z}_\ell$, and thus matrix $\mathcal{A}$, that are applicable in these cases if necessary. The $\mathbf{Z}_\ell$ can also be measured directly, for example by performing a spectral scan and measuring the varying SOP $\hat{s}(\nu)$ at the output of the 2-segs with a polarimeter, and performing a DFT of the measured SOP.

b) The three governing Stokes vectors, $\hat{s}_o$, $p_0$ and $p_1$, are defined within a common rotation applied to the three. This means that the definition of $\mathcal{A}$ and the measured PDL are the same if a global rotation is applied to the true Stokes vectors, only the angles between them, the coupling angles, matter. That is the reason why we can express the $\mathbf{Z}_\ell$ as a function of only the two known coupling angles $\varphi_{\hat{s}o}$ and $\varphi_p$. Accordingly, we arbitrarily set $p_1 = \hat{u}_1 = (0\ 0\ 0)^T$ in the expressions below. The physical $p_1$ does not need to be equal to $\hat{u}_1$. It is simply equivalent to a global rotation of the three vectors such that $p_1\hat{u}_1$ after the rotation is applied.

Figure 9:
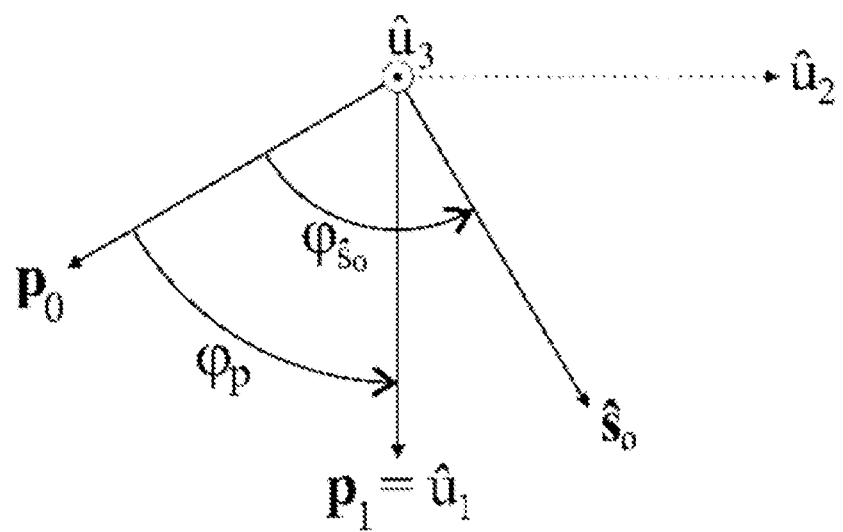
FIG. 9 is a schematic illustrating the relationship between the governing Stokes vectors, $\hat{s}_o$, $p_0$ and $p_1$, and the coupling angles ($\varphi_{\hat{s}o}$, $\varphi_p$ characterizing the 2-segment passive SOP generator.

FIG. 9 illustrates the relationship between the governing Stokes vectors, $\hat{s}_o$, $p_0$ and $p_1$, and the coupling angles $\varphi_{\hat{s}o}$ and $\varphi_p$, wherein ($\hat{u}_1\ \hat{u}_2\ \hat{u}_3$) are the cartesian base vectors of the standard 3D Stokes vectors space.

Setting $p_1 = \hat{u}_1$ as mentioned above, $\hat{s}_o$, $p_o$ and $p_1$, are computed as, $$p_1 = \text{Stokes}(0,0)$$

$$p_0 = \text{Stokes}(-\varphi_p, 0)$$

$$\hat{s}_o = \text{Stokes}[(\varphi_{\hat{s}o} - \varphi_p), 0] \quad (12)$$

where Stokes($\varphi$, $\psi$) represents the specification of a 3-element unit Stokes vector in terms of spherical coordinates. Of note is that $\psi = 0$ ("equator" of the Poincaré sphere) is the circle encompassing all possible linear SOPs.

Then the announced analytical expressions of the complex vectorial amplitudes $\mathbf{Z}_\ell$, with $\ell = -4..4$ since here J=4 for the specified r≥2.5, reads as, $$z_0 = (\cos\varphi_{\hat{s}o}\cos\varphi_p)p_1$$

$$z_1 = \tfrac{1}{2}[\cos\varphi_{\hat{s}o}(p_0 - \cos\varphi_p p_1)] + i\tfrac{1}{2}[\cos\varphi_{\hat{s}o}(p_1 \times p_0)]$$

$$z_2 = \tfrac{1}{4}[\hat{s}_o - \cos\varphi'_{\hat{s}}p_1 + \cos\varphi_{\hat{s}o}(\cos\varphi_p p_1 - p_0 + v_{xx})] + i\tfrac{1}{4}[(p_0 - p_1)\times\hat{s}_o + \cos\varphi_{\hat{s}o}(p_1\times p_0)]$$

$$z_3 = \tfrac{1}{2}(\cos\varphi'_{\hat{s}} - \cos\varphi_p)p_1$$

$$z_2 = \tfrac{1}{4}[\hat{s}_o - \cos\varphi'_{\hat{s}}p_1 + \cos\varphi_{\hat{s}o}(\cos\varphi_p p_1 - p_0 + v_{xx})] + i\tfrac{1}{4}[(p_0 - p_1)\times\hat{s}_o + \cos\varphi_{\hat{s}o}(p_1\times p_0)]$$

$$\mathbf{z}_{-\ell} = \mathbf{z}_\ell^* \quad (13)$$

where we defined $\cos\varphi'_{\hat{s}} = (p_1 \cdot \hat{s}_o)$ and $v_{xx} = p_1 \times (p_0 \times \hat{s}_o)$. Whenever the above specified conditions 1) and 2) are met, the values (13) of the $\mathbf{z}_\ell$ can be put in (9) to construct matrix $\mathcal{A}$ and then compute the response vector of the DUT according to (8) and (10).

Processing of the Resolved-Sidebands (RSB) Method

After some usual data conditioning of the sampled data, e.g. cropping ends having transients, resampling and/or decimation if necessary or useful, etc., the inputs to the processing of RSB are:

(1) a vector T of N values $T_n = T(\nu_n)$ of the power transmission curve, n=0 . . . (N−1), at optical frequencies $\nu_n$ with a substantially constant step dν between successive samples. T is computed beforehand from the sampled outputs $P_{in}(\nu_n)$ and $P_{out}(\nu_n)$ as $T_n = P_{out.n}/P_{in.n}$.

(2) a vector $P_\varphi$ of N values $P_{\varphi.n} = P_\varphi(\nu_n)$ of the phase reference output $P_\varphi(\nu)$ at the same optical frequencies $\nu\nu_n$ as for T.

The processing of these inputs by RSB is described in detail below in the form of comments, definitions and other pertinent information put around the actual procedures applied to real data.

Figure 10:
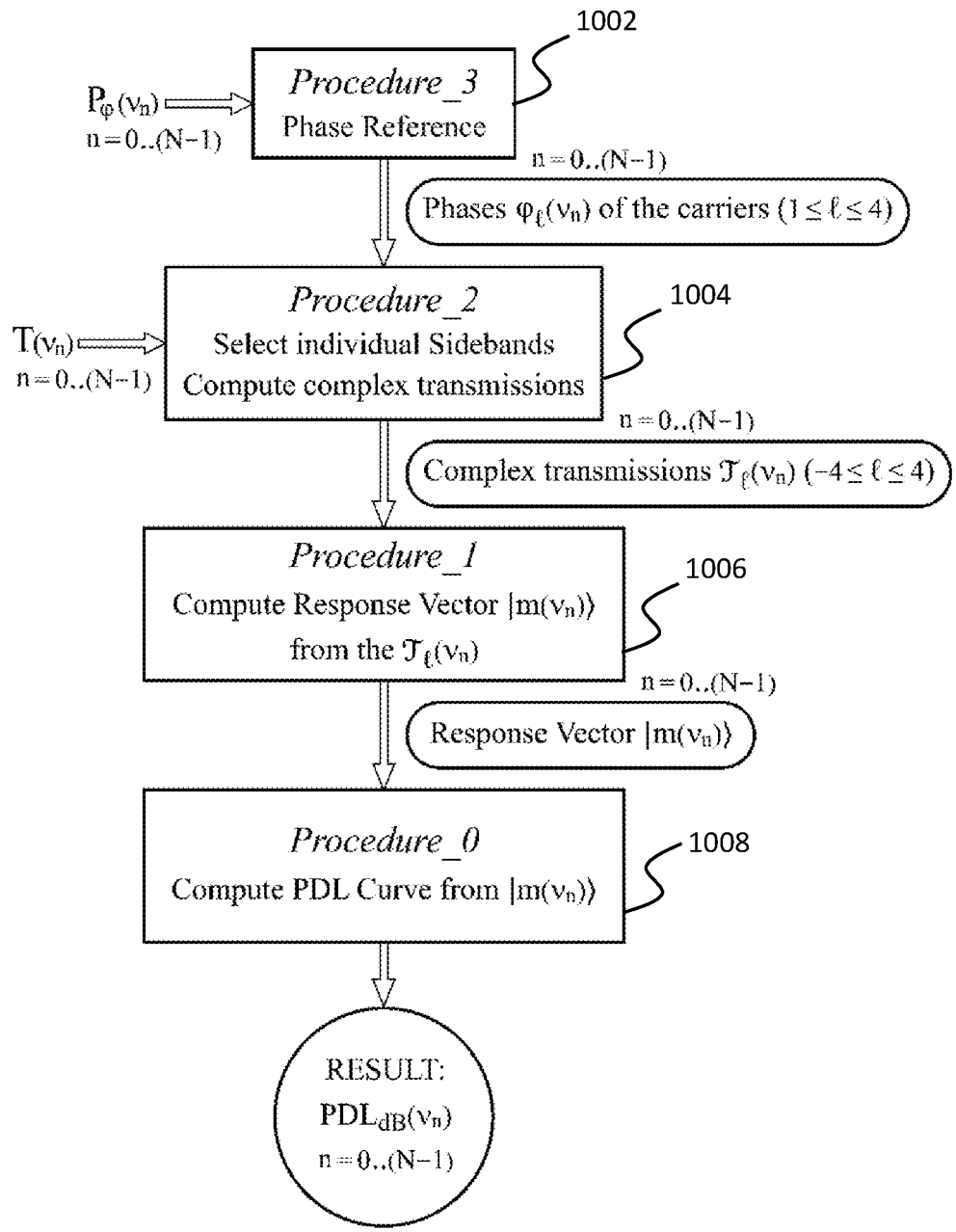
FIG. 10 is a flowchart showing the steps of the resolved-sidebands (RSB) processing method.

FIG. 10 shows the main steps of the RSB processing, comprising an optional step 1002 of retrieving the phases $\varphi_\ell(\nu_n)$ of the sideband-carriers with $\ell = 1$ . . . J, n=0 . . . (N−1), using said vector $P_\varphi$ as input; a step 1004 of extracting individually each sideband from the DFT of said vector T to compute complex transmissions T $\mathcal{T}_\ell(\nu_n)$, $\ell = -J$ . . . J, n=0 . . . (N−1); a step 1006 of computing the response vector of the DUT at each $\nu_n$, $|m(\nu_n)\rangle$, from the complex transmissions $\mathcal{T}_\ell(\nu_n)$ and said matrix $\mathcal{A}$ according to (8) and (10); and a step 1008 of computing $\text{PDL}(\nu_n)$, the PDL curve of the DUT, from the response vector $|m(\nu_n)\rangle$, n=0 . . . (N−1).

Step 1002

In step 1002, a processing unit receives the sampled phase reference output $P_\varphi(\nu_n)$ or, more specifically, a vector $P_\varphi$ of N values $P_{\varphi.n} = P_\varphi(\nu_n)$ of the phase reference output at optical frequencies $\nu_n$, n=0 . . . (N−1). From these values, the procedure of step 1002 derives the phases $\varphi_\ell(\nu_n)$ of the sideband-carriers with $\ell = 1$ to J, n=0 . . . (N−1), which are used in step 1004 (Procedure_2).

FIG. 11 expresses the procedure (Procedure_3) of step 1002 in more details.

Step 1004

In step 1004, the processing unit receives the sampled power transmission curve $T(\nu_n)$ or, more specifically, vector T of N values $T_n = T(\nu_n)$ of the power transmission curve at optical frequencies $\nu_n$, n=0 . . . (N−1). From these values, the procedure of step 1004 extracts individually each sideband from the DFT of said vector T to compute complex transmissions $\mathcal{T}_\ell(\nu_n)$ with $\ell = -J$ . . . J, n=0 . . . (N−1).

The procedure involves:

a) calculating a Discrete Fourier Transform (DFT) of the power transmission curve T(ν), wherein the DFT shows at least two sidebands; and b) extracting individually each sideband from the DFT of transmission curve T(v) to compute complex transmissions $\mathcal{T}_\ell(v)$.

More specifically, at the end of Procedure_2 the processing unit reshuffles the resulting $\mathcal{T}_\ell(v_n)$ data into a single vector $|\mathcal{T}\rangle$ of N values $|\mathcal{T}\rangle_n$ at sampled points n, wherein each $|\mathcal{T}\rangle_n$ is itself a vector whose elements are the 9 values $\mathcal{T}_\ell(v_n)$ where $-4 \leq \ell \leq 4$. This reshuffling is not fundamentaly required, but it eases the next calculations in Procedure_1 by making them faster than otherwise, as well as making this procedure very compact from a programmatic point of view.

FIG. 12 expresses the procedure (Procedure_2) of step 1004 in more details.

Step 1006

In step 1006, the processing unit receives the complex transmissions $\mathcal{T}_\ell(v)$ derived in step 1004, or more specifically vector $|\mathcal{T}\rangle$, and computes the response vector $|m(v)\rangle$ of the DUT.

More specifically, the processing unit computes $|m(v_n)\rangle$ from vector $|\mathcal{T}\rangle_n$ obtained in step 1004 and known matrix $\mathcal{A}$ defined hereinabove, for each sampled point $n=0 \ldots (N-1)$.

FIG. 13 expresses the procedure (Procedure_1) of step 1006 in more details.

Step 1008

In step 1008, the processing unit computes the spectrally-varying PDL of the DUT from the response vector $|m(v)\rangle$.

FIG. 14 expresses the procedure (Procedure_0) of step 1008 in more details.

The input to the procedure is a vector $|m\rangle$ of N values $|m\rangle_n = |m(v_n)\rangle$ of the response vector, $n=0 \ldots (N-1)$, wherein each $|m\rangle_n$ is itself a 4-component vector. The output may comprise a vector PDL or $PDL_{dB}$ of N values $PDL_n$ or $PDL_{dB,n}$ of the PDL of the DUT at optical frequencies $v_n$, where $n=0 \ldots (N-1)$. Of note is that, in accordance with the most widespread definition and tradition, the PDL value returned by Procedure_0 is expressed in dB.

The embodiments described above are intended to be exemplary only. The scope of the invention is therefore intended to be limited solely by the appended claims.

Glossary of Main Parameters and Variables v: optical frequency
$\tau$: delay (Fourier-transform conjugate variable of v)
J : number of wavelength scans with fixed input-SOPs in the classic Mueller Matrix Method
J: number of sidebands on one side of the Fourier transform in the resolved-sidebands method (RSB)
T(v): power transmission curve as a function of v
$\mathcal{T}_\ell(v)$: complex transmission associated to sideband-carrier $\ell$ as a function of v, wherein $\ell = -J \ldots J$
$\tau_\ell$ : carrier-delay of sideband-carrier $\ell$ (similar to carrier frequency but here, the carrier is characterized by its delay instead of its frequency)
$|m(v)\rangle$: response vector of the DUT as a function of v
$\mathcal{A}$ : equivalent matrix of RSB representing the system of equations to be solved
$z_\ell$ : complex vectorial amplitude of the sideband-carrier $\ell$
$P_\varphi(v)$: phase-reference output
$P_{in}(v)$: optical power of the test lightwave at the input of the DUT
$P_{out}(v)$: optical power of the test lightwave at the output of the DUT
$\delta\tau_0, \delta\tau_1$: differential group delay (DGD) of first and second segment of the 2-segment passive SOP generator, respectively
$p_0, p_1$: principal state of polarization (PSP) of first and second segment of the 2-segment passive SOP generator, respectively
r: ratio of the DGDs ($r=\delta\tau_0/\delta\tau_1$) of first and second segments of the 2-segment passive SOP generator
$\varphi_{\hat{s}o}, \varphi_p$: coupling angles characterizing the 2-segment passive SOP generator
$\hat{s}$: 3-component unit Stokes vector representing the SOP of the 100% polarized input test lightwave.
$\tau_+$: total extent in the delay domain containing all sidebands (e.g. 4 in the example where J=4);
$\tau_g$: spacing between sidebands (e.g. 1 ns in the exemple where $\delta\tau_0$=3 ns and $\delta\tau_1$=1 ns);
$f_+$: extent of the signal-frequency scale containing all sidebands (~½ signal bandwidth or single-sided bandwidth);
$f_e$: sampling frequency

The invention claimed is:

1. A method for measuring the Polarization Dependent Loss (PDL) of a Device Under Test (DUT) within a spectral range, comprising:
   generating an input test lightwave which State Of Polarization (SOP), as represented by a point on the surface of the Poincaré sphere, varies according to a continuous trajectory while being spectrally scanned over the spectral range and launching the input test lightwave into the DUT;
   measuring the power transmission through the DUT, curve T(v), during a spectral scan of the input test lightwave;
   calculating a Discrete Fourier Transform (DFT) of the power transmission curve T(v), wherein the DFT shows at least two sidebands;
   extracting said sidebands and computing an inverse DFT of each said sidebands to obtain complex transmissions $\tau_\ell(v)$;
   computing the response vector $|m(v)\rangle$ of the DUT from said complex transmissions $\tau_\ell(v)$ and a matrix $\mathcal{A}$ determined by the continuous trajectory of the SOP of the input test lightwave by solving the linear system of equations defined by $|\mathcal{T}(v)\rangle = \mathcal{A} |m(v)\rangle$ wherein $|\mathcal{T}(v)\rangle$ is constructed from said complex transmissions $\tau_\ell(v)$;
   deriving the spectrally-varying PDL of the DUT from said response vector $|m(v)\rangle$.

2. The method as claimed in claim 1, wherein the continuous trajectory of the SOP of the input test lightwave over the spectral range is known or predetermined and the matrix $\mathcal{A}$ derived therefrom.

3. The method as claimed in claim 1, wherein the phase of the SOP of the input lightwave along the continuous trajectory is determined at each sampled point.

4. The method as claimed in claim 3, wherein said phase is determined from a phase reference signal measured at the output of a polarizer receiving a portion of the input test lightwave.

5. The method as claimed in claim 1, wherein measuring the power transmission curve T(v) comprises sampling data asynchronously with respect to the SOP variation of the input test lightwave.

6. The method as claimed in claim 1, wherein the SOP of the input test lightwave is varied using a passive SOP generator.

7. The method as claimed in claim 6, wherein the passive SOP generator comprises a first and a second polarization-splitting Mach-Zehnder interferometer.

8. The method as claimed in claim 7, wherein the ratio r of the differential group delay (DGD) of the first segment over the differential group delay (DGD) of the second segment is substantially equal to an integer value.

9. The method as claimed in claim 8, wherein the ratio r is substantially equal to 3.

10. The method as claimed in claim 1, further comprising deriving at least one of the polarization-dependent center wavelength (PDCW) and the polarization-dependent bandwidth (PDBW) of the DUT.

11. A system for measuring the Polarization Dependent Loss (PDL) of a Device Under Test (DUT) within a spectral range, comprising:
- a tunable light source to generate a test lightwave and spectrally scanning the test lightwave over the spectral range;
- a State Of Polarization (SOP) generator connected to the tunable light source and configured for varying the SOP of the test lightwave according to a continuous trajectory on the surface of the Poincaré Sphere while the test lightwave is spectrally scanned over the spectral range, the test lightwave to be launched into the DUT;
- a power transmission measurement apparatus connected to the SOP generator and comprising a first photodetector and a second photodetector for measuring power values of the test lightwave at the input and the output of the DUT, respectively;
- an acquisition device connected to the power transmission measurement apparatus and comprising an analog-to-digital converter sampling the measured power values during a spectral scan of the test lightwave to produce a measured power transmission curve $T(v)$;
- a processing unit connected to the acquisition device to receive said measured power transmission curve $T(v)$ and configured for:
  - calculating a Discrete Fourier Transform (DFT) of said power transmission curve $T(v)$, wherein the DFT shows at least two sidebands;
  - extracting said sidebands and computing an inverse DFT of each said sidebands to obtain complex transmissions $\tau_\ell(vv)$;
  - computing the response vector $|m(v)\rangle$ of the DUT from said complex transmissions $\tau_\ell(v)$ and a matrix $\mathcal{A}$ determined by the continuous trajectory of the SOP of the input test lightwave by solving the linear system of equations defined by $|\mathcal{T}(v)\rangle = \mathcal{A}|m(v)\rangle$ wherein $|\mathcal{T}(v)\rangle$ is constructed from said complex transmission $\tau_\ell(v)$; and
  - deriving the spectrally-varying PDL of the DUT from said response vector $|m(v)\rangle$.

12. The system as claimed in claim 11, wherein the continuous trajectory of the SOP of the input test lightwave over the spectral range is known or predetermined and the matrix $\mathcal{A}$ derived therefrom.

13. The system as claimed in claim 11, further comprising a phase reference arm to determine a phase of the SOP of the input lightwave along the continuous trajectory at each sampled point, said phase reference arm comprising a polarizer followed by a photodetector.

14. The system as claimed in claim 11, wherein values of the power transmission through the DUT are sampled by the acquisition device asynchronously with respect to the SOP variation of the input test lightwave.

15. The system as claimed in claim 11, wherein the SOP generator is a passive SOP generator.

16. The system as claimed in claim 15, wherein the passive SOP generator comprises a first and a second polarization-splitting Mach-Zehnder interferometer.

17. The system as claimed in claim 16, wherein the ratio r of the differential group delay (DGD) of the first segment over the differential group delay (DGD) of the second segment is substantially equal to an integer value.

18. The system as claimed in claim 17, wherein the ratio r is substantially equal to 3.

19. The system as claimed in claim 11, wherein processing unit is configured for further deriving at least one of the polarization-dependent center wavelength (PDCW) and the polarization-dependent bandwidth (PDBW) of the DUT.

* * * * *